United States Patent
Hong et al.

(10) Patent No.: US 9,444,276 B2
(45) Date of Patent: Sep. 13, 2016

(54) MOBILE TERMINAL CAPABLE OF BEING CHARGED IN A WIRED OR WIRELESS MANNER

(71) Applicant: LG ELECTRONICS INC., Seoul (KR)

(72) Inventors: Byoungyong Hong, Seoul (KR); Kyungsoon Park, Seoul (KR); Mansoo Sin, Seoul (KR); Jeewoo Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 476 days.

(21) Appl. No.: 13/935,159

(22) Filed: Jul. 3, 2013

(65) Prior Publication Data

US 2014/0191713 A1   Jul. 10, 2014

(30) Foreign Application Priority Data

Jan. 8, 2013   (KR) ......................... 10-2013-0002231

(51) Int. Cl.
*H02J 7/00*   (2006.01)
*H02J 5/00*   (2016.01)
*H02J 7/02*   (2016.01)

(52) U.S. Cl.
CPC .............. *H02J 7/0029* (2013.01); *H02J 5/005* (2013.01); *H02J 7/025* (2013.01)

(58) Field of Classification Search
None
See application file for complete search history.

(56) References Cited

U.S. PATENT DOCUMENTS

| 2010/0308665 A1* | 12/2010 | Itkonen | ................... H02J 5/005 307/104 |
| 2013/0062961 A1* | 3/2013 | Park | ....................... H02J 17/00 307/104 |

* cited by examiner

*Primary Examiner* — A. M. Thompson
(74) *Attorney, Agent, or Firm* — Lee, Hong, Degerman, Kang & Waimey PC; Jonathan Kang; Justin Lee

(57) ABSTRACT

A mobile terminal capable of being charged in a wired or wireless manner is disclosed. Some embodiments of the disclosed mobile terminal include a terminal body having a battery, a contact unit formed at one side of the terminal body and coupled to an adaptor, and a plurality of conductive lines configured to connect the contact unit with the battery, where a first conductive line passes through a first charging unit configured to charge the battery with power received wirelessly from a wireless power transmitter, where a second conductive line passes through the second charging unit, and the first conductive line and the second conductive line diverge at a first point and converge at a second point between the contact unit and the battery.

16 Claims, 13 Drawing Sheets

MOBILE TERMINAL CAPABLE OF BEING CHARGED IN A WIRED OR WIRELESS MANNER

CROSS-REFERENCE TO RELATED APPLICATION

Pursuant to 35 U.S.C. §119(a), this application claims the benefit of earlier filing date and right of priority to Korean Application No. 10-2013-0002231, filed on Jan. 8, 2013 the contents of which is incorporated by reference herein in its entirety.

BACKGROUND OF THE DISCLOSURE

1. Field of the Disclosure

The present disclosure relates to a mobile terminal, and particularly, to a mobile terminal capable of being charged in a wired or wireless manner.

2. Background of the Disclosure

As functions of a mobile terminal become more diversified, the mobile terminal can support more complicated functions such as capturing images or video, reproducing music or video files, playing games, receiving broadcast signals, and the like. By comprehensively and collectively implementing such functions, the mobile terminal may be embodied in the form of a multimedia player or a device.

Terminals can be divided into mobile/portable terminals and stationary terminals according to their mobility. The mobile terminal is a portable device that can be carried anywhere and have one or more of a function of performing voice and video calls, a function of inputting/outputting information, a function of storing data, etc.

In order to support and enhance such functions of the terminal, it can be considered to improve configuration and/or software of the terminal.

Recently, being developed is a mobile terminal which can be wirelessly charged without an adaptor for connecting an external power to the mobile terminal. A method, capable of enhancing a charging efficiency and effectively controlling heat generation occurring from inside of a mobile terminal which can be wirelessly charged, may be proposed.

SUMMARY OF THE DISCLOSURE

Therefore, an aspect of the detailed description is to provide a mobile terminal having a more enhanced charging efficiency.

Another aspect of the detailed description is to provide a mobile terminal having a more enhanced structure, and capable of effectively controlling heat generation occurring from inside thereof.

To achieve these and other advantages and in accordance with the purpose of this specification, as embodied and broadly described herein, there is provided a mobile terminal, comprising: a terminal body having a battery; a contact unit formed at one side of the terminal body and coupled to an adaptor; and a plurality of conductive lines configured to connect the contact unit with the battery; wherein a first conductive line of the plurality of conductive lines passes through a first charging unit configured to charge the battery with power received wirelessly from a wireless power transmitter.

According to an embodiment of the present invention, a second conductive line of the plurality of conductive lines may pass through a power management integrated circuit (PMIC).

According to an embodiment of the present invention, the PMIC may comprise a second charging unit for charging the battery with power received from the adaptor.

According to an embodiment of the present invention, the second conductive line may pass through the second charging unit; and the first conductive line and the second conductive line may diverge at a first point and may converge at a second point between the contact unit and the battery.

According to an embodiment of the present invention, a resistance of the diverged first conductive line may be A ohms; a resistance of the diverged second conductive line may be B ohms; and a combined resistance of the first conductive line and the second conductive line may be $A*B/(A+B)$ ohms when a current is applied to the plurality of conductive lines via the adaptor.

According to an embodiment of the present invention, a voltage drop may across each of the first conductive line and the second conductive line may be approximately 0.7 V.

According to an embodiment of the present invention, the mobile terminal may further comprise a switch configured to selectively connect the contact unit to at least one of the plurality of conductive lines; and a controller configured to control at least the switch, the first charging unit, or the second charging unit.

According to an embodiment of the present invention, the controller may be further configured to control at least the first charging unit or the second charging unit to stop charging the battery when a temperature of the battery exceeds a predetermined threshold value while the battery is being charged.

According to an embodiment of the present invention, the controller may be further configured to control at least the first charging unit or the second charging unit to decrease an amount of a current charging the battery when a temperature of the battery exceeds a predetermined threshold value while the battery is being charged.

According to an embodiment of the present invention, the controller may be further configured to control the switch to release a connection between the at least one of the plurality of conductive lines and the contact unit when a temperature of the battery exceeds a predetermined threshold value while the battery is being charged.

According to an embodiment of the present invention, the controller may be further configured to perform at least a first operation, a second operation, or a third operation based on a temperature of the battery: the first operation comprises controlling the switch to release a connection between the at least one of the plurality of conductive lines and the contact unit; the second operation comprises at least determining whether to control the first charging unit or the second charging unit to charge the battery; and the third operation comprises at least controlling the first charging unit or the second charging unit to reduce an amount of a current charging the battery.

According to an embodiment of the present invention, the mobile terminal may further comprise a battery cover coupled to the terminal body and configured to cover the battery; and a power receiving unit disposed at the battery cover and configured to wirelessly receive power from the wireless power transmitter.

According to an embodiment of the present invention, the first charging unit may be formed at the terminal body and positioned adjacent to the battery and the first charging unit is electrically connected to the power receiving unit via the first conductive line.

According to another aspect of the present invention, there is provided a mobile terminal, comprising: a terminal body having a battery; a contact unit formed at one side of the terminal body and coupled to an adapter; a plurality of charging units; a plurality of conductive lines each passing through one of the plurality of charging units and configured to connect the contact unit to the battery; a switch configured to selectively connect the contact unit with at least one of the plurality of conductive lines; and a controller configured to control the switch or the plurality of charging units such that a charged state of the battery is controlled.

According to an embodiment of the present invention, the plurality of charging units may comprise a first charging unit; and a first conductive line of the plurality of conductive lines passes through the first charging unit for charging the battery with power received wirelessly from a wireless power transmitter.

According to an embodiment of the present invention, a second conductive line of the plurality of conductive lines may pass through a power management integrated circuit (PMIC).

According to an embodiment of the present invention, the plurality of charging units may further comprise a second charging unit; and the PMIC comprises the second charging unit.

According to an embodiment of the present invention, the controller may be further configured to perform at least a first operation, a second operation, or a third operation when a temperature of the battery exceeds a predetermined threshold value while the battery is being charged; the first operation comprises controlling the switch to release the connection between the at least one of the plurality of conductive lines and the contact unit; the second operation comprises determining whether to control at least one of the plurality of charging units to charge the battery; and the third operation comprises controlling at least one of the plurality of charging units to reduce an amount of a current charging the battery.

According to an embodiment of the present invention, the controller may be further configured to perform at least a first operation, a second operation, or a third operation when a temperature of at least one of the plurality of charging units exceeds a predetermined threshold value while the battery is being charged; the first operation comprises controlling the switch to release the connection between the at least one of the plurality of conductive lines and the contact unit; the second operation comprises determining whether to control at least one of the plurality of charging units to charge the battery; and the third operation comprises controlling at least one of the plurality of charging units to reduce an amount of a current charging the battery.

According to an embodiment of the present invention, the mobile terminal may further comprise a battery cover coupled to the terminal body and configured to cover the battery, wherein: the plurality of charging units comprises a first charging unit formed at the terminal body and electrically connected to the battery; and the battery cover comprises a power receiving unit electrically connected to the first charging unit and configured to wirelessly receive power from a wireless power transmitter to charge the battery.

The mobile terminal according to the present invention can have the following advantages.

Firstly, since the mobile terminal is provided with the plurality of charging units and the conductive lines are diverged from each other to pass through the charging units, a combined resistance of the diverged conductive lines can be lowered.

Secondly, since a voltage drop due to resistance, which occurs from each of the diverged conductive lines can be lowered to a prescribed value, an adaptor of a low input voltage can be used. Under such configuration, the mobile terminal can be charged using an adaptor of high compatibility.

Thirdly, a heat source can be distributed as the charging unit is formed in plurality. As a result, the amount of heat generation from the mobile terminal can be reduced.

Fourthly, as the plurality of heat sources are independently controlled, heat generation from the mobile terminal can be effectively controlled during a charging operation.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings.

DETAILED DESCRIPTION OF THE DISCLOSURE

Figure 1:
FIG. 1 is an exemplary view illustrating a wireless power transmitter and an electronic device according to preferred embodiments of the present invention.

Description will now be given in detail of the exemplary embodiments, with reference to the accompanying drawings. For the sake of brief description with reference to the drawings, the same or equivalent components will be provided with the same reference numbers, and description thereof will not be repeated.

The technologies disclosed herein may be applicable to wireless power transfer (contactless power transfer). However, the technologies disclosed herein are not limited to this, and may be also applicable to all kinds of power transmission systems and methods, wireless charging circuits and methods to which the technological spirit of the technology can be applicable, in addition to the methods and apparatuses using power transmitted in a wireless manner.

It should be noted that technological terms used herein are merely used to describe a specific embodiment, but not to limit the present invention. Also, unless particularly defined otherwise, technological terms used herein should be construed as a meaning that is generally understood by those having ordinary skill in the art to which the invention pertains, and should not be construed too broadly or too narrowly. Furthermore, if technological terms used herein are wrong terms unable to correctly express the spirit of the invention, then they should be replaced by technological terms that are properly understood by those skilled in the art. In addition, general terms used in this invention should be construed based on the definition of dictionary, or the context, and should not be construed too broadly or too narrowly.

Incidentally, unless clearly used otherwise, expressions in the singular number include a plural meaning. In this application, the terms "comprising" and "including" should not be construed to necessarily include all of the elements or steps disclosed herein, and should be construed not to include some of the elements or steps thereof, or should be construed to further include additional elements or steps.

In addition, a suffix "module" or "unit" used for constituent elements disclosed in the following description is merely intended for easy description of the specification, and the suffix itself does not give any special meaning or function.

Furthermore, the terms including an ordinal number such as first, second, etc. can be used to describe various elements, but the elements should not be limited by those terms. The terms are used merely for the purpose to distinguish an element from the other element. For example, a first element may be named to a second element, and similarly, a second element may be named to a first element without departing from the scope of right of the invention.

Hereinafter, preferred embodiments of the present invention will be described in detail with reference to the accompanying drawings, and the same or similar elements are designated with the same numeral references regardless of the numerals in the drawings and their redundant description will be omitted.

In describing the present invention, moreover, the detailed description will be omitted when a specific description for publicly known technologies to which the invention pertains is judged to obscure the gist of the present invention. Also, it should be noted that the accompanying drawings are merely illustrated to easily explain the spirit of the invention, and therefore, they should not be construed to limit the spirit of the invention by the accompanying drawings.

FIG. 1—Conceptual View of Wireless Power Transmitter and Electronic Device

FIG. 1 is an exemplary view conceptually illustrating a wireless power transmitter and an electronic device according to the embodiments of the present invention.

Referring to FIG. 1, the wireless power transmitter 100 may be a power transfer apparatus configured to transfer power required for the electronic device (or wireless power receiver) 200 in a wireless manner.

Furthermore, the wireless power transmitter 100 may be a wireless charging apparatus configured to charge a battery of the electronic device (or wireless power receiver) 200 by transferring power in a wireless manner. A case where the wireless power transmitter 100 is a wireless charging apparatus will be described later with reference to FIG. 9.

Additionally, the wireless power transmitter 100 may be implemented with various forms of apparatuses transferring power to the electronic device (or wireless power receiver) 200 requiring power in a contactless state.

The electronic device (or wireless power receiver) 200 is a device that is operable by receiving power from the wireless power transmitter 100 in a wireless manner. Furthermore, the electronic device (or wireless power receiver) 200 may charge a battery using the received wireless power.

On the other hand, an electronic device for receiving power in a wireless manner as described herein should be construed broadly to include a portable phone, a cellular phone, a smart phone, a personal digital assistant (PDA), a portable multimedia player (PMP), a tablet, a multimedia device, or the like, in addition to an input/output device such as a keyboard, a mouse, an audio-visual auxiliary device, and the like.

The electronic device (or wireless power receiver) 200, as described later, may be a mobile communication terminal, (for example, a portable phone, a cellular phone, and a tablet or multimedia device). In case where the electronic device is a mobile terminal, it will be described later with reference to FIG. 10.

On the other hand, the wireless power transmitter 100 may transfer power in a wireless manner without mutual contact to the electronic device (or wireless power receiver) 200 using one or more wireless power transfer methods. In other words, the wireless power transmitter 100 may transfer power using at least one of an inductive coupling method based on magnetic induction phenomenon by the wireless power signal and a magnetic resonance coupling method based on electromagnetic resonance phenomenon by a wireless power signal at a specific frequency.

Wireless power transfer in the inductive coupling method is a technology transferring power in a wireless manner using a primary coil and a secondary coil, and refers to the transmission of power by inducing a current from a coil to another coil through a changing magnetic field by a magnetic induction phenomenon.

Wireless power transfer in the inductive coupling method refers to a technology in which the electronic device (or wireless power receiver) 200 generates resonance by a wireless power signal transmitted from the wireless power transmitter 100 to transfer power from the wireless power transmitter 100 to the wireless power receiver 200 by the resonance phenomenon.

Hereinafter, the wireless power transmitter 100 and electronic device (or wireless power receiver) 200 according to the embodiments disclosed herein will be described in detail. In assigning reference numerals to the constituent elements in each of the following drawings, the same reference numerals will be used for the same constituent elements even though they are shown in a different drawing.

Figure 2A:
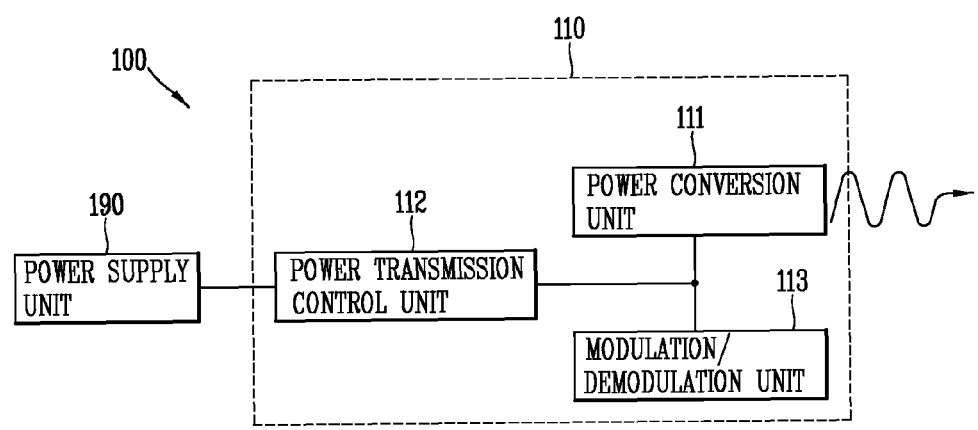
FIGS. 2A and 2B are block diagrams illustrating a configuration of a wireless power transmitter 100 and an electronic device 200 according to preferred embodiments of the present invention.
Figure 2B:
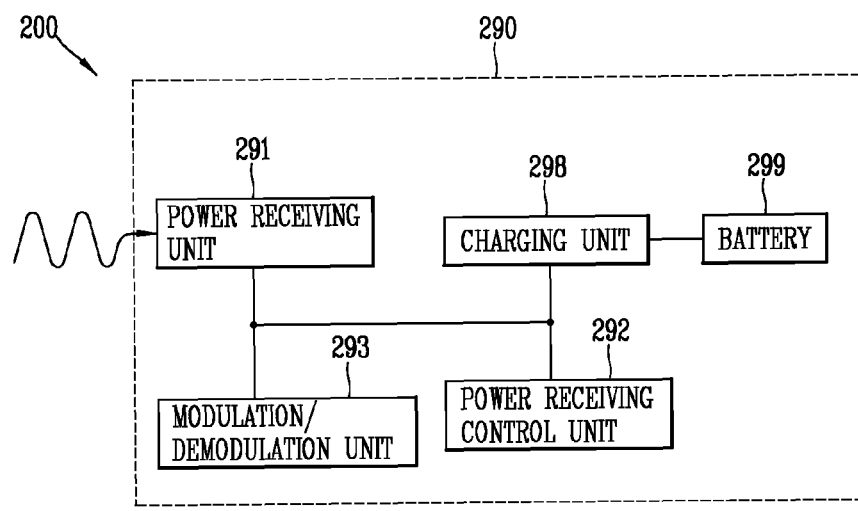

FIGS. 2A and 2B are an exemplary block diagrams illustrating the configuration of a wireless power transmitter 100 and an electronic device (or wireless power receiver) 200 that can be employed in the embodiments disclosed herein.

FIG. 2A—Wireless Power Transmitter

Referring to FIG. 2A, the wireless power transmitter 100 may include a power transmission unit 110. The power transmission unit 110 may include a power conversion unit 111 and a power transmission control unit 112.

The power conversion unit 111 transfers power supplied from a transmission side power supply unit 190 to the electronic device (or wireless power receiver) 200 by converting it into a wireless power signal. The wireless power signal transferred by the power conversion unit 111 is generated in the form of a magnetic field or electro-magnetic field having an oscillation characteristic. For this purpose, the power conversion unit 111 may be configured to include a coil for generating the wireless power signal.

The power conversion unit 111 may include a constituent element for generating a different type of wireless power signal according to each power transfer method.

In accordance with exemplary embodiments, the power conversion unit 111 may include a primary coil for forming a changing magnetic field to induce a current to a secondary coil of the electronic device (or wireless power receiver) 200. Furthermore, the power conversion unit 111 may include a coil (or antenna) for forming a magnetic field having a specific resonant frequency to generate a resonant frequency in the electronic device (or wireless power receiver) 200 according to the resonance coupling method.

Furthermore, the power conversion unit 111 may transfer power using at least one of the foregoing inductive coupling method and the resonance coupling method.

Among the constituent elements included in the power conversion unit 111, those for the inductive coupling method will be described later with reference to FIGS. 4 and 5, and those for the resonance coupling method will be described with reference to FIGS. 7 and 8.

On the other hand, the power conversion unit 111 may further include a circuit for controlling the characteristics of a used frequency, an applied voltage, an applied current or the like to form the wireless power signal.

The power transmission control unit 112 controls each of the constituent elements included in the power transmission unit 110 The power transmission control unit 112 may be implemented to be integrated into another control unit (not shown) for controlling the wireless power transmitter 100.

On the other hand, a region to which the wireless power signal can be approached may be divided into two types. First, an active area denotes a region through which a wireless power signal transferring power to the electronic device (or wireless power receiver) 200 is passed. Next, a semi-active area denotes an interest region in which the wireless power transmitter 100 can detect the existence of the electronic device (or wireless power receiver) 200. Here, the power transmission control unit 112 may detect whether the electronic device (or wireless power receiver) 200 is placed in the active area or detection area or removed from the area. Specifically, the power transmission control unit 112 may detect whether or not the electronic device (or wireless power receiver) 200 is placed in the active area or detection area using a wireless power signal formed from the power conversion unit 111 or a sensor separately provided therein. For instance, the power transmission control unit 112 may detect the presence of the electronic device (or wireless power receiver) 200 by monitoring whether or not the characteristic of power for forming the wireless power signal is changed by the wireless power signal, which is affected by the electronic device (or wireless power receiver) 200 existing in the detection area. However, the active area and detection area may vary according to the wireless power transfer method such as an inductive coupling method, a resonance coupling method, and the like.

The power transmission control unit 112 may perform the process of identifying the electronic device (or wireless power receiver) 200 or determine whether to start wireless power transfer according to a result of detecting the existence of the electronic device (or wireless power receiver) 200.

Furthermore, the power transmission control unit 112 may determine at least one characteristic of a frequency, a voltage, and a current of the power conversion unit 111 for forming the wireless power signal. The determination of the characteristic may be carried out by a condition at the side of the wireless power transmitter 100 or a condition at the side of the electronic device (or wireless power receiver) 200. In exemplary embodiments, the power transmission control unit 112 may decide the characteristic based on device identification information. In another exemplary embodiment, the power transmission control unit 112 may decide the characteristic based on required power information of the electronic device (or wireless power receiver) 200 or profile information related to the required power. The power transmission control unit 112 may receive a power control message from the electronic device (or wireless power receiver) 200. The power transmission control unit 112 may determine at least one characteristic of a frequency, a voltage and a current of the power conversion unit 111 based on the received power control message, and additionally perform other control operations based on the power control message.

For example, the power transmission control unit 112 may determine at least one characteristic of a frequency, a voltage and a current used to form the wireless power signal according to the power control message including at least one of rectified power amount information, charging state information and identification information in the electronic device (or wireless power receiver) 200.

Furthermore, as another control operation using the power control message, the wireless power transmitter 100 may perform a typical control operation associated with wireless power transfer based on the power control message. For example, the wireless power transmitter 100 may receive information associated with the electronic device (or wireless power receiver) 200 to be auditorily or visually outputted through the power control message, or receive information required for authentication between devices.

In exemplary embodiments, the power transmission control unit 112 may receive the power control message through the wireless power signal. In other exemplary embodiment, the power transmission control unit 112 may receive the power control message through a method for receiving user data.

In order to receive the foregoing power control message, the wireless power transmitter 100 may further include a modulation/demodulation unit 113 electrically connected to the power conversion unit 111. The modulation/demodulation unit 113 may modulate a wireless power signal that has been modulated by the electronic device (or wireless power receiver) 200 and use it to receive the power control message. The method for allowing the power conversion unit 111 to receive a power control message using a wireless power signal will be described later with reference to FIGS. 11 through 13.

In addition, the power transmission control unit 112 may acquire a power control message by receiving user data including a power control message by a communication means (not shown) included in the wireless power transmitter 100.

In accordance with one exemplary embodiment, the wireless power transmitter 100 may supply power to a plurality of electronic devices. Here, collision may occur between wireless power signal which have been modulated by the plurality of electronic devices. Hence, the constituent elements included in the wireless power transmitter 100 may perform various operations to avoid such collision between the modulated wireless power signal.

In one exemplary embodiment, the power conversion unit 111 may convert power supplied from the transmission side power supply unit 190 into a wireless power signal and transfer it to the plurality of electronic devices. For example, the plurality of electronic devices may be two electronic devices, namely, a first electronic device and a second electronic device.

The power conversion unit 111 may generate a wireless power signal for power transmission, and receive a first response signal and a second response signal corresponding to the wireless power signal.

The power transmission control unit 112 may determine whether or not the first and second response signals collide with each other. When the first and second response signals collide with each other according to the determination result, the power transmission control unit 112 may reset the power transmission.

The first and second response signals may be generated by modulating the wireless power signal through the first and second electronic devices.

Through the resetting of the power transmission, the power transmission control unit 112 may control the power conversion unit 111 to sequentially receive the first and second response signals, which are generated to avoid collision with each other.

The sequential reception indicates that the first response signal is received after a first time interval and the second response signal is received after a second time interval within a predetermined response period. The first and second time intervals may be decided based on a value obtained by generating a random number.

The predetermined response period (Tping interval) may be decided to be long enough to include both the first response signal and the second response signal. Also, it may be decided after resetting the power transmission.

In accordance with one exemplary embodiment, occurrence or non-occurrence of the collision may be determined according to whether or not the first and second response signals are decoded using a preset format. The preset format may include a preamble, a header and a message. Whether or not the first and second response signals collide with each other may be determined based on whether or not the first and second response signals are not recoverable due to an error generation in at least one of the preamble, the header and the message caused by the collision.

In accordance with one exemplary embodiment, the power conversion unit 111 may periodically receive a response signal of the first device, which does not collide with a response signal of the second device within a first response period (Tping interval_1). The power transmission control unit may decode the first response signal and the second response signal using a preset format, and determine whether or not the first and second response signals have collided with each other based on whether or not the decoding is performed. Here, the first response signal and the second response signal may be periodically received within a second response period (Tping interval_2). The second response period (Tping interval_2) may be decided long enough to include both the first and second response signals, and be decided after resetting the power transmission.

FIG. 2B—Electronic Device

Referring to FIG. 2B, the electronic device (or wireless power receiver) 200 may include a power supply unit 290. The power supply unit 290 supplies power required for the operation of the electronic device (or wireless power receiver) 200. The power supply unit 290 may include a power receiving unit 291 and a Power reception control unit (or POWER RECEIVING CONTROL UNIT) 292.

The power receiving unit 291 receives power transferred from the wireless power transmitter 100 in a wireless manner.

The power receiving unit 291 may include constituent elements required to receive the wireless power signal according to a wireless power transfer method. Furthermore, the power receiving unit 291 may receive power according to at least one wireless power transfer method, and in this case, the power receiving unit 291 may include constituent elements required for each method.

First, the power receiving unit 291 may include a coil for receiving a wireless power signal transferred in the form of a magnetic field or electromagnetic field having a vibration characteristic.

For instance, as a constituent element according to the inductive coupling method, the power receiving unit 291 may include a secondary coil to which a current is induced by a changing magnetic field. In exemplary embodiments, the power receiving unit 291, as a constituent element according to the resonance coupling method, may include a coil and a resonant circuit in which resonance phenomenon is generated by a magnetic field having a specific resonant frequency.

In another exemplary embodiments, when the power receiving unit 291 receives power according to at least one wireless power transfer method, the power receiving unit 291 may be implemented to receive power by using a coil, or implemented to receive power by using a coil formed differently according to each power transfer method.

Among the constituent elements included in the power receiving unit 291, those for the inductive coupling method will be described later with reference to FIGS. 4A and 4B, and those for the resonance coupling method with reference to FIGS. 7A and 7B.

On the other hand, the power receiving unit 291 may further include a rectifier and a regulator to convert the wireless power signal into a direct current. Furthermore, the power receiving unit 291 may further include a circuit for protecting an overvoltage or overcurrent from being generated by the received power signal.

The Power reception control unit (or POWER RECEIVING CONTROL UNIT) 292 may control each constituent element included in the power supply unit 290.

Specifically, the Power reception control unit (or POWER RECEIVING CONTROL UNIT) 292 may transfer a power control message to the wireless power transmitter 100. The power control message may instruct the wireless power transmitter 100 to initiate or terminate a transfer of the wireless power signal. Furthermore, the power control message may instruct the wireless power transmitter 100 to control a characteristic of the wireless power signal.

In exemplary embodiments, the Power reception control unit (or POWER RECEIVING CONTROL UNIT) 292 may transmit the power control message through the wireless power signal. In another exemplary embodiment, the Power reception control unit (or POWER RECEIVING CONTROL UNIT) 292 may transmit the power control message through a method for transmitting user data.

In order to transmit the foregoing power control message, the electronic device (or wireless power receiver) 200 may further include a modulation/demodulation unit 293 electrically connected to the power receiving unit 291. The modulation/demodulation unit 293, similarly to the case of the wireless power transmitter 100, may be used to transmit the power control message through the wireless power signal. The power communications modulation/demodulation unit 293 may be used as a means for controlling a current and/or voltage flowing through the power conversion unit 111 of the wireless power transmitter 100. Hereinafter, a method for allowing the power communications modulation/demodulation unit 113 or 293 at the side of the wireless power transmitter 100 and at the side of the electronic device (or wireless power receiver) 200, respectively, to be used to transmit and receive a power control message through a wireless power signal will be described.

A wireless power signal formed by the power conversion unit 111 is received by the power receiving unit 291. At this time, the Power reception control unit (or POWER RECEIVING CONTROL UNIT) 292 controls the power communications modulation/demodulation unit 293 at the side of the electronic device (or wireless power receiver) 200 to modulate the wireless power signal. For instance, the Power reception control unit (or POWER RECEIVING CONTROL UNIT) 292 may perform a modulation process such that a power amount received from the wireless power signal is varied by changing a reactance of the power communications modulation/demodulation unit 293 connected to the power receiving unit 291. The change of a power amount received from the wireless power signal results in the change of a current and/or voltage of the power conversion unit 111 for forming the wireless power signal. At this time, the modulation/demodulation unit 113 at the side of the wireless power transmitter 100 may detect a change of the current and/or voltage to perform a demodulation process.

In other words, the Power reception control unit (or POWER RECEIVING CONTROL UNIT) 292 may generate a packet including a power control message intended to be transferred to the wireless power transmitter 100 and modulate the wireless power signal to allow the packet to be included therein, and the power transmission control unit 112 may decode the packet based on a result of performing the demodulation process of the power communications modulation/demodulation unit 113 to acquire the power control message included in the packet. The detailed method of allowing the wireless power transmitter 100 to acquire the power control message will be described later with reference to FIGS. 11 through 13.

In addition, the Power reception control unit (or POWER RECEIVING CONTROL UNIT) 292 may transmit a power control message to the wireless power transmitter 100 by transmitting user data including the power control message by a communication means (not shown) included in the electronic device (or wireless power receiver) 200.

In addition, the power supply unit 290 may further include a charger (or charging unit) 298 and a battery 299.

The electronic device (or wireless power receiver) 200 receiving power for operation from the power supply unit 290 may be operated by power transferred from the wireless power transmitter 100, or operated by charging the battery 299 using the transferred power and then receiving the charged power. At this time, the Power reception control unit (or POWER RECEIVING CONTROL UNIT) 292 may control the charger (or charging unit) 298 to perform charging using the transferred power.

In one exemplary embodiment, the plurality of electronic devices may receive power from the wireless power transmitter 100. Here, collision may occur between wireless power signal which have been modulated by the plurality of electronic devices. Hence, the constituent elements included in the wireless power transmitter 100 may perform various operations to avoid such collision between the modulated wireless power signal.

In one exemplary embodiment, the power receiving unit 291 may receive the wireless power signal for the power transmission from the wireless power transmitter.

Here, the Power reception control unit (or POWER RECEIVING CONTROL UNIT) 292 may control the power receiving unit 291 to transmit a third response signal corresponding to the wireless power signal after a time interval set to a first time within the first response period (Tping interval_1).

In one exemplary embodiment, the Power reception control unit (or POWER RECEIVING CONTROL UNIT) 292 may determine whether or not the power transmission of the wireless power transmitter 100 has been reset due to collision between the modulated wireless power signal, and set the time interval to a second time when the power transmission has been reset according to the determination result.

In one exemplary embodiment, the Power reception control unit (or POWER RECEIVING CONTROL UNIT) 292 may control the power receiving unit 291 to transmit a fourth response signal corresponding to the wireless power signal after the time interval set to the second time within the second response period (Tping interval_2). The second time may be decided by a value obtained by generating a random number. Hereinafter, a wireless power transmitter and an electronic device applicable to the embodiments disclosed herein will be described.

First, a method of allowing the wireless power transmitter to transfer power to the electronic device according to the inductive coupling method will be described with reference to FIGS. 3 through 5.

Figure 3:
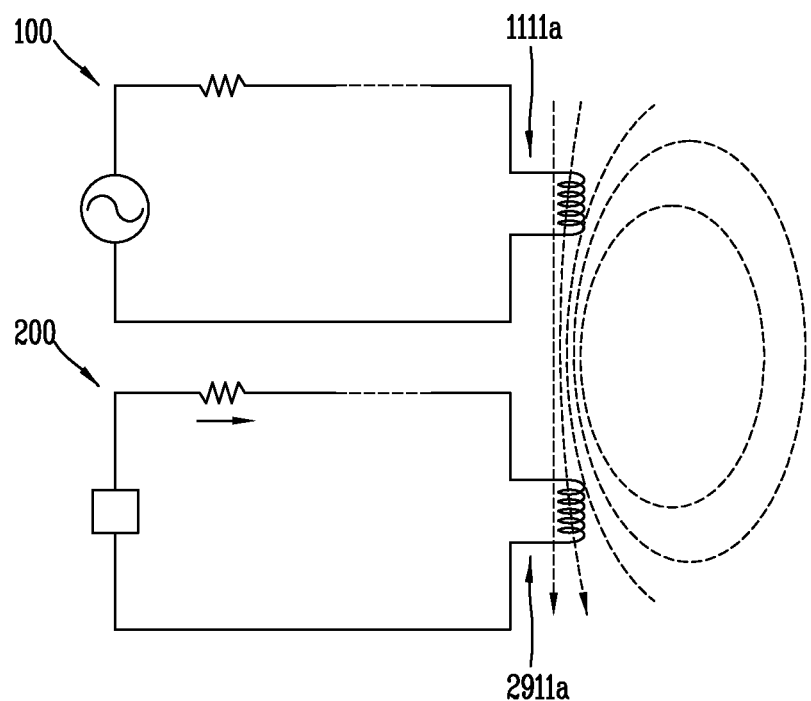
FIG. 3 is a conceptual view illustrating that power is wirelessly transmitted from a wireless power transmitter to an electronic device by an inductive coupling method.

FIG. 3—Inductive Coupling Method

FIG. 3 is a view illustrating a concept in which power is transferred from a wireless power transmitter to an electronic device in a wireless manner according to an inductive coupling method.

When the power of the wireless power transmitter 100 is transferred in an inductive coupling method, if the strength of a current flowing through a primary coil within the power transmission unit 110 is changed, then a magnetic field passing through the primary coil will be changed by the current. The changed magnetic field generates an induced electromotive force at a secondary coil in the electronic device (or wireless power receiver) 200.

According to the foregoing method, the power conversion unit 111 of the wireless power transmitter 100 may include a transmitting (Tx) coil 1111a being operated as a primary coil in magnetic induction. Furthermore, the power receiving unit 291 of the electronic device (or wireless power receiver) 200 may include a receiving (Rx) coil 2911a being operated as a secondary coil in magnetic induction.

First, the wireless power transmitter 100 and electronic device (or wireless power receiver) 200 are disposed in such a manner that the transmitting (Tx) coil 1111a at the side of the wireless power transmitter 100 and the receiving coil at the side of the electronic device (or wireless power receiver) 200 are located adjacent to each other. Then, if the power transmission control unit 112 controls a current of the transmitting (Tx) coil 1111a to be changed, then the power receiving unit 291 controls power to be supplied to the electronic device (or wireless power receiver) 200 using an electromotive force induced to the receiving (Rx) coil 2911a.

The efficiency of wireless power transfer by the inductive coupling method may be little affected by a frequency characteristic, but affected by an alignment and distance between the wireless power transmitter 100 and the electronic device (or wireless power receiver) 200 including each coil.

On the other hand, in order to perform wireless power transfer in the inductive coupling method, the wireless power transmitter 100 may be configured to include an interface surface (not shown) in the form of a flat surface. One or more electronic devices may be placed at an upper portion of the interface surface, and the transmitting (Tx) coil 1111a may be mounted at a lower portion of the interface surface. In this case, a vertical spacing is formed in a small-scale between the transmitting (Tx) coil 1111a mounted at a lower portion of the interface surface and the receiving (Rx) coil 2911a of the electronic device (or wireless power receiver) 200 placed at an upper portion of the interface surface, and thus a distance between the coils becomes sufficiently small to efficiently implement contactless power transfer by the inductive coupling method.

Furthermore, an alignment indicator (not shown) indicating a location where the electronic device (or wireless power receiver) 200 is to be placed at an upper portion of the interface surface. The alignment indicator indicates a location of the electronic device (or wireless power receiver) 200 where an alignment between the transmitting (Tx) coil 1111a mounted at a lower portion of the interface surface and the receiving (Rx) coil 2911a can be suitably implemented. The alignment indicator may alternatively be simple marks, or may be formed in the form of a protrusion structure for guiding the location of the electronic device (or wireless power receiver) 200. Otherwise, the alignment indicator may be formed in the form of a magnetic body such as a magnet mounted at a lower portion of the interface surface, thereby guiding the coils to be suitably arranged by mutual magnetism to a magnetic body having an opposite polarity mounted within the electronic device (or wireless power receiver) 200.

On the other hand, the wireless power transmitter 100 may be formed to include one or more transmitting coils. The wireless power transmitter 100 may selectively use some of coils suitably arranged with the receiving (Rx) coil 2911a of the electronic device (or wireless power receiver) 200 among the one or more transmitting coils to enhance the power transmission efficiency. The wireless power transmitter 100 including the one or more transmitting coils will be described later with reference to FIG. 5.

Hereinafter, a configuration of the wireless power transmitter and electronic device using an inductive coupling method applicable to the embodiments disclosed herein will be described in detail.

Figure 4A:
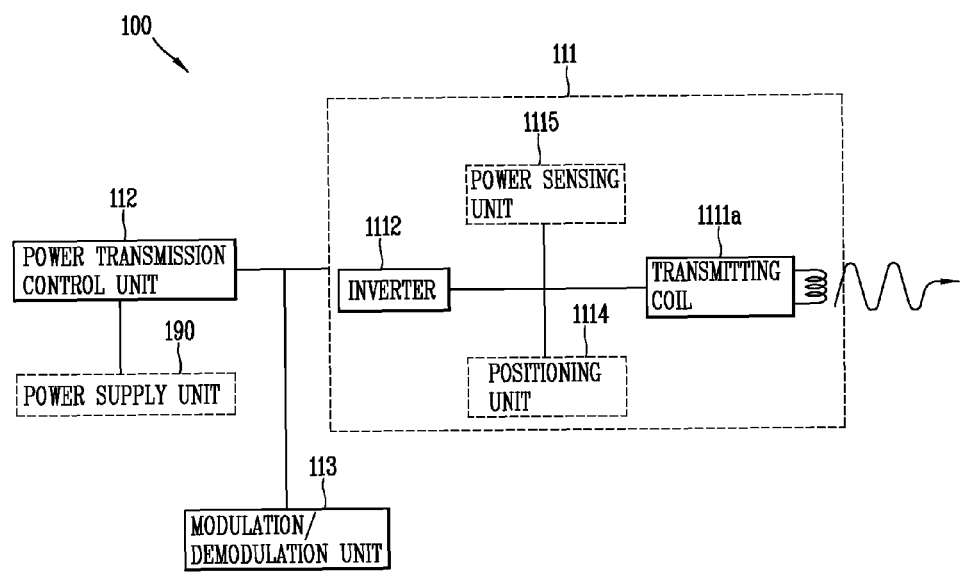
FIGS. 4A and 4B are block diagrams illustrating a configuration of a wireless power transmitter 100 and an electronic device 200 by an electromagnetic induction method which can be applied to preferred embodiments of the present invention.
Figure 4B:
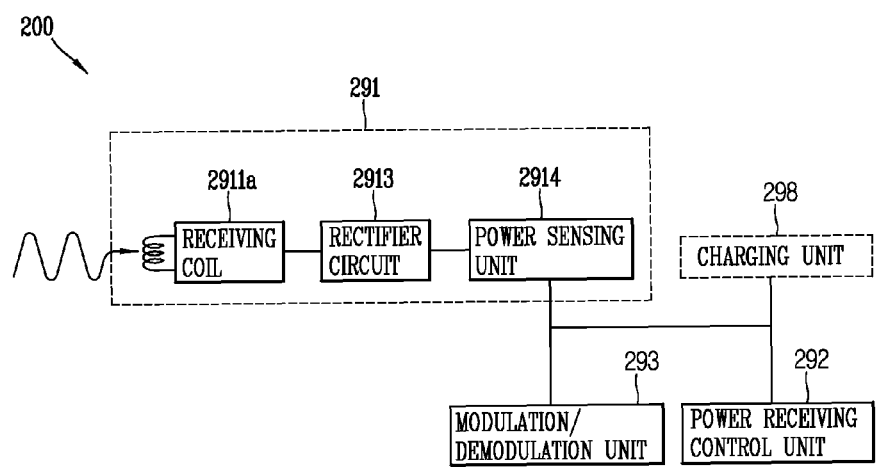

FIGS. 4A and 4B—Wireless Power Transmitter and Electronic Device in Inductive Coupling Method FIGS. 4A and 4B are a block diagram illustrating part of the wireless power transmitter 100 and electronic device (or wireless power receiver) 200 in a magnetic induction method that can be employed in the embodiments disclosed herein. A configuration of the power transmission unit 110 included in the wireless power transmitter 100 will be described with reference to FIG. 4A, and a configuration of the power supply unit 290 included in the electronic device (or wireless power receiver) 200 will be described with reference to FIG. 4B.

Referring to FIG. 4A, the power conversion unit 111 of the wireless power transmitter 100 may include a transmitting (Tx) coil 1111a and an inverter 1112.

The transmitting (Tx) coil 1111a may form a magnetic field corresponding to the wireless power signal according to a change of current as described above. The transmitting (Tx) coil 1111a may alternatively be implemented with a planar spiral type or cylindrical solenoid type.

The inverter 1112 transforms a DC input obtained from the power supply unit 190 into an AC waveform. The AC current transformed by the inverter 1112 drives a resonant circuit including the transmitting (Tx) coil 1111a and a capacitor (not shown) to form a magnetic field in the transmitting (Tx) coil 1111a.

In addition, the power conversion unit 111 may further include a positioning unit 1114.

The positioning unit 1114 may move or rotate the transmitting (Tx) coil 1111a to enhance the effectiveness of contactless power transfer using the inductive coupling method. As described above, it is because an alignment and distance between the wireless power transmitter 100 and the electronic device (or wireless power receiver) 200 including a primary coil and a secondary coil may affect power transfer using the inductive coupling method. In particular, the positioning unit 1114 may be used when the electronic device (or wireless power receiver) 200 does not exist within an active area of the wireless power transmitter 100.

Accordingly, the positioning unit 1114 may include a drive unit (not shown) for moving the transmitting (Tx) coil 1111a such that a center-to-center distance of the transmitting (Tx) coil 1111a of the wireless power transmitter 100 and the receiving (Rx) coil 2911a of the electronic device (or wireless power receiver) 200 is within a predetermined range, or rotating the transmitting (Tx) coil 1111a such that the centers of the transmitting (Tx) coil 1111*a* and the receiving (Rx) coil 2911*a* are overlapped with each other.

For this purpose, the wireless power transmitter 100 may further include a detection unit (not shown) made of a sensor for detecting the location of the electronic device (or wireless power receiver) 200, and the power transmission control unit 112 may control the positioning unit 1114 based on the location information of the electronic device (or wireless power receiver) 200 received from the location detection sensor.

Furthermore, to this end, the power transmission control unit 112 may receive control information on an alignment or distance to the electronic device (or wireless power receiver) 200 through the power communications modulation/demodulation unit 113, and control the positioning unit 1114 based on the received control information on the alignment or distance.

If the power conversion unit 111 is configured to include a plurality of transmitting coils, then the positioning unit 1114 may determine which one of the plurality of transmitting coils is to be used for power transmission. The configuration of the wireless power transmitter 100 including the plurality of transmitting coils will be described later with reference to FIG. 5.

On the other hand, the power conversion unit 111 may further include a power sensing unit 1115. The power sensing unit 1115 at the side of the wireless power transmitter 100 monitors a current or voltage flowing into the transmitting (Tx) coil 1111*a*. The power sensing unit 1115 is provided to check whether or not the wireless power transmitter 100 is normally operated, and thus the power sensing unit 1115 may detect a voltage or current of the power supplied from the outside, and check whether the detected voltage or current exceeds a threshold value. The power sensing unit 1115, although not shown, may include a resistor for detecting a voltage or current of the power supplied from the outside and a comparator for comparing a voltage value or current value of the detected power with a threshold value to output the comparison result. Based on the check result of the power sensing unit 1115, the power transmission control unit 112 may control a switching unit (not shown) to cut off power applied to the transmitting (Tx) coil 1111*a*.

Referring to FIG. 4B, the power supply unit 290 of the electronic device (or wireless power receiver) 200 may include a receiving (Rx) coil 2911*a* and a rectifier (or rectifying) circuit 2913.

A current is induced into the receiving (Rx) coil 2911*a* by a change of the magnetic field formed in the transmitting (Tx) coil 1111*a*. The implementation type of the receiving (Rx) coil 2911*a* may be a planar spiral type or cylindrical solenoid type similarly to the transmitting (Tx) coil 1111*a*.

Furthermore, series and parallel capacitors may be configured to be connected to the receiving (Rx) coil 2911*a* to enhance the effectiveness of wireless power reception or perform resonant detection.

The receiving (Rx) coil 2911*a* may be in the form of a single coil or a plurality of coils.

The rectifier (or rectifying) circuit 2913 performs a full-wave rectification to a current to convert alternating current into direct current. The rectifier (or rectifying) circuit 2913, for instance, may be implemented with a full-bridge rectifier generation circuit made of four diodes or a circuit using active components.

In addition, the rectifier (or rectifying) circuit 2913 may further include a regulator circuit for converting a rectified current into a more flat and stable direct current. Furthermore, the output power of the rectifier (or rectifying) circuit 2913 is supplied to each constituent element of the power supply unit 290. Furthermore, the rectifier (or rectifying) circuit 2913 may further include a DC-DC converter for converting output DC power into a suitable voltage to adjust it to the power required for each constituent element (for instance, a circuit such as a charger (or charging unit) 298).

The power communications modulation/demodulation unit 293 may be connected to the power receiving unit 291, and may be configured with a resistive element in which resistance varies with respect to direct current, and may be configured with a capacitive element in which reactance varies with respect to alternating current. The Power reception control unit (or POWER RECEIVING CONTROL UNIT) 292 may change the resistance or reactance of the power communications modulation/demodulation unit 293 to modulate a wireless power signal received to the power receiving unit 291.

On the other hand, the power supply unit 290 may further include a power sensing unit 2914. The power sensing unit 2914 at the side of the electronic device (or wireless power receiver) 200 monitors a voltage and/or current of the power rectified by the rectifier (or rectifying) circuit 2913, and if the voltage and/or current of the rectified power exceeds a threshold value as a result of monitoring, then the Power reception control unit (or POWER RECEIVING CONTROL UNIT) 292 transmits a power control message to the wireless power transmitter 100 to transfer suitable power.

Figure 5:
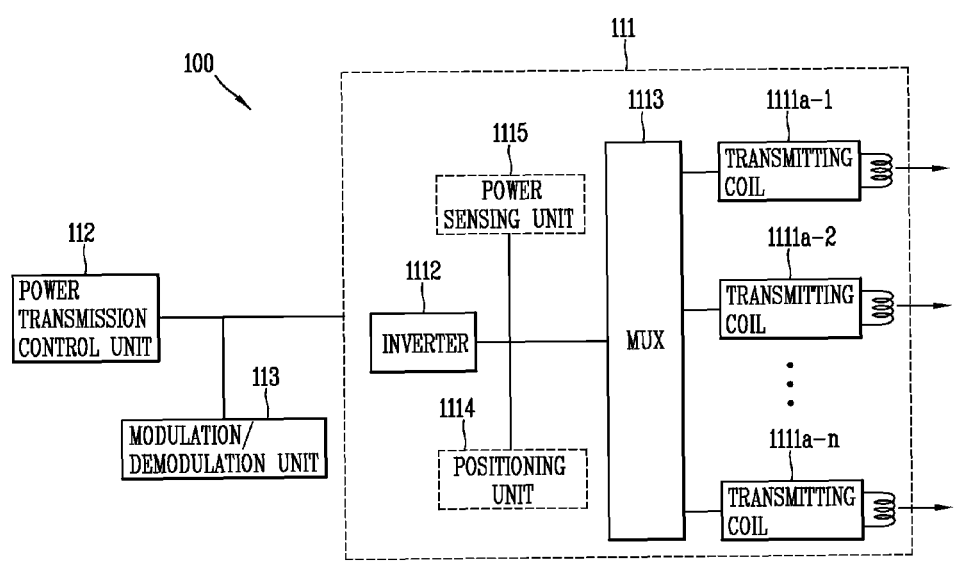
FIG. 5 is a block diagram of a wireless power transmitter having one or more transmitting coils for receiving power by an inductive coupling method which can be applied to embodiments of the present invention.

FIG. 5—Wireless Power Transmitter Configured to Include One or More Transmitting Coils FIG. 5 is a block diagram illustrating a wireless power transmitter configured to have one or more transmitting coils receiving power according to an inductive coupling method that can be employed in the embodiments disclosed herein.

Referring to FIG. 5, the power conversion unit 111 of the wireless power transmitter 100 according to the embodiments disclosed herein may include one or more transmitting coils 1111*a*-1 to 1111*a-n*. The one or more transmitting coils 1111*a*-1 to 1111*a-n* may be an array of partly overlapping primary coils. An active area may be determined by some of the one or more transmitting coils.

The one or more transmitting coils 1111*a*-1 to 1111*a-n* may be mounted at a lower portion of the interface surface. Furthermore, the power conversion unit 111 may further include a multiplexer 1113 for establishing and releasing the connection of some of the one or more transmitting coils 1111*a*-1 to 1111*a-n*.

Upon detecting the location of the electronic device (or wireless power receiver) 200 placed at an upper portion of the interface surface, the power transmission control unit 112 may take the detected location of the electronic device (or wireless power receiver) 200 into consideration to control the multiplexer 1113, thereby allowing coils that can be placed in an inductive coupling relation to the receiving (Rx) coil 2911*a* of the electronic device (or wireless power receiver) 200 among the one or more transmitting coils 1111*a*-1 to 1111*a-n* to be connected to one another.

For this purpose, the power transmission control unit 112 may acquire the location information of the electronic device (or wireless power receiver) 200. For example, the power transmission control unit 112 may acquire the location of the electronic device (or wireless power receiver) 200 on the interface surface by the location detection unit (not shown) provided in the wireless power transmitter 100. For another example, the power transmission control unit 112 may alternatively receive a power control message indicating a strength of the wireless power signal from an object on the interface surface or a power control message indicating the identification information of the object using the one or more transmitting coils 1111*a*-1 to 1111*a*-*n*, respectively, and determines whether it is located adjacent to which one of the one or more transmitting coils based on the received result, thereby acquiring the location information of the electronic device (or wireless power receiver) 200.

On the other hand, the active area as part of the interface surface may denote a portion through which a magnetic field with a high efficiency can pass when the wireless power transmitter 100 transfers power to the electronic device (or wireless power receiver) 200 in a wireless manner. At this time, a single transmitting coil or one or a combination of more transmitting coils forming a magnetic field passing through the active area may be designated as a primary cell. Accordingly, the power transmission control unit 112 may determine an active area based on the detected location of the electronic device (or wireless power receiver) 200, and establish the connection of a primary cell corresponding to the active area to control the multiplexer 1113, thereby allowing the receiving (Rx) coil 2911*a* of the electronic device (or wireless power receiver) 200 and the coils belonging to the primary cell to be placed in an inductive coupling relation.

In the meantime, upon disposing one or more electronic devices 200 on an interface surface of the wireless power transmitter 100, which includes the one or more transmitting coils 1111*a*-1 to 1111*a*-*n*, the power transmission control unit 112 may control the multiplexer 1113 to allow the coils belonging to the primary cell corresponding to the position of each electronic device to be placed in the inductive coupling relation. Accordingly, the wireless power transmitter 100 may generate the wireless power signal using different coils, thereby transferring it to the one or more electronic devices in a wireless manner.

Also, the power transmission control unit 112 may set power having a different characteristic to be supplied to each of the coils corresponding to the electronic devices. Here, the wireless power transmitter 100 may transfer power by differently setting a power transfer scheme, efficiency, characteristic and the like for each electronic device. The power transmission for one or more electronic devices will be described later with reference to FIG. 28.

Furthermore, the power conversion unit 111 may further include an impedance matching unit (not shown) for controlling an impedance to form a resonant circuit with the coils connected thereto.

Hereinafter, a method for allowing a wireless power transmitter to transfer power according to a resonance coupling method will be disclosed with reference to FIGS. 6 through 8.

Figure 6:
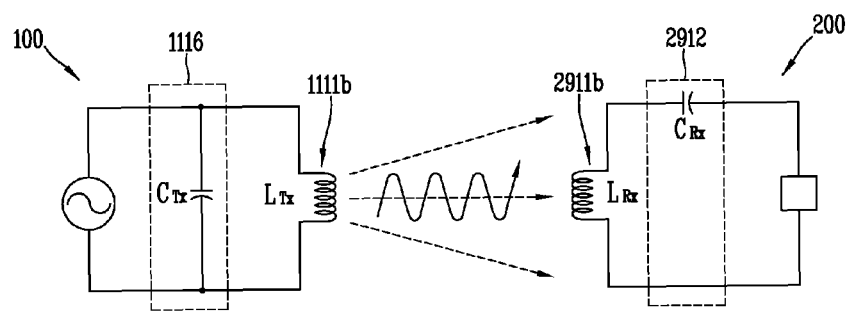
FIG. 6 is a conceptual view illustrating that power is wirelessly transmitted from a wireless power transmitter to an electronic device by a resonance coupling method.

FIG. 6—Resonance Coupling Method

FIG. 6 is a view illustrating a concept in which power is transferred to an electronic device from a wireless power transmitter in a wireless manner according to an resonance coupling method.

First, resonance will be described in brief as follows. Resonance refers to a phenomenon in which an amplitude of vibration is remarkably increased when periodically receiving an external force having the same frequency as the natural frequency of a vibration system. Resonance is a phenomenon occurring at all kinds of vibrations such as mechanical vibration, electric vibration, and the like. Generally, when exerting a vibratory force to a vibration system from the outside, if the natural frequency thereof is the same as a frequency of the externally applied force, then the vibration becomes strong, thus increasing the width.

With the same principle, when a plurality of vibrating bodies separated from one another within a predetermined distance vibrate at the same frequency, the plurality of vibrating bodies resonate with one another, and in this case, resulting in a reduced resistance between the plurality of vibrating bodies. In an electrical circuit, a resonant circuit can be made by using an inductor and a capacitor.

When the wireless power transmitter 100 transfers power according to the inductive coupling method, a magnetic field having a specific vibration frequency is formed by alternating current power in the power transmission unit 110. If a resonance phenomenon occurs in the electronic device (or wireless power receiver) 200 by the formed magnetic field, then power is generated by the resonance phenomenon in the electronic device (or wireless power receiver) 200.

However, if the plurality of vibrating bodies resonate with each other in an electromagnetic manner as aforementioned, extremely high power transmission efficiency may be exhibited due to non affection by adjacent objects except for the vibrating bodies. An energy tunnel may be generated between the plurality of vibrating bodies which resonate with each other in the electromagnetic manner. This may be referred to as energy coupling or energy tail.

The resonance coupling disclosed herein may use an electromagnetic wave having a low frequency. When power is transferred using the electromagnetic wave having the low frequency, only a magnetic field may affect an area located within a single wavelength of the electromagnetic wave. The magnetic resonance may be generated when the wireless power transmitter 100 and the electronic device (or wireless power receiver) 200 are located within the single wavelength of the electromagnetic wave having the low frequency.

Here, in general, human bodies are sensitive to an electric field but tolerant to a magnetic field. Hence, when power is transferred using a magnetic resonance, the human bodies may be badly affected due to being exposed to the electromagnetic wave. Also, as the energy tail is generated in response to the resonance phenomenon, the form of power transmission may exhibit a non-radiative property. Consequently, upon transferring power using such electromagnetic wave, a radiative problem which occurs frequently may be solved.

The resonance coupling method may be a method for transferring power using the electromagnetic wave with the low frequency, as aforementioned. Thus, the transmitting (Tx) coil 1111*b* of the wireless power transmitter 100 may form a magnetic field or electromagnetic wave for transferring power in principle. However, the resonance coupling method will be described hereinafter from the perspective of a magnetic resonance, namely, a power transmission by a magnetic field.

The resonant frequency may be determined by the following formula in Equation 1.

$$f = \frac{1}{2\pi\sqrt{LC}} \qquad \text{[Equation 1]}$$

Here, the resonant frequency (f) is determined by an inductance (L) and a capacitance (C) in a circuit. In a circuit forming a magnetic field using a coil, the inductance can be determined by a number of turns of the coil, and the like, and the capacitance can be determined by a gap between the coils, an area, and the like. In addition to the coil, a capacitive resonant circuit may be configured to be connected thereto to determine the resonant frequency.

Referring to FIG. 6, when power is transmitted in a wireless manner according to the resonance coupling method, the power conversion unit 111 of the wireless power transmitter 100 may include a transmitting (Tx) coil 1111b in which a magnetic field is formed and a resonant circuit (or RESONANT GENERATION CIRCUIT) 1116 connected to the transmitting (Tx) coil 1111b to determine a specific vibration frequency. The resonant circuit (or RESONANT GENERATION CIRCUIT) 1116 may be implemented by using a capacitive circuit (capacitors), and the specific vibration frequency may be determined based on an inductance of the transmitting (Tx) coil 1111b and a capacitance of the resonant circuit (or RESONANT GENERATION CIRCUIT) 1116.

The configuration of a circuit element of the resonant circuit (or RESONANT GENERATION CIRCUIT) 1116 may be implemented in various forms such that the power conversion unit 111 forms a magnetic field, and is not limited to a form of being connected in parallel to the transmitting (Tx) coil 1111b as illustrated in FIG. 6.

Furthermore, the power receiving unit 291 of the electronic device (or wireless power receiver) 200 may include a resonant circuit (or RESONANT GENERATION CIRCUIT) 2912 and a receiving (Rx) coil 2911b to generate a resonance phenomenon by a magnetic field formed in the wireless power transmitter 100. In other words, the resonant circuit (or RESONANT GENERATION CIRCUIT) 2912 may be also implemented by using a capacitive circuit, and the resonant circuit (or RESONANT GENERATION CIRCUIT) 2912 is configured such that a resonant frequency determined based on an inductance of the receiving coil 2911b and a capacitance of the resonant circuit (or RESONANT GENERATION CIRCUIT) 2912 has the same frequency as a resonant frequency of the formed magnetic field.

The configuration of a circuit element of the resonant circuit (or RESONANT GENERATION CIRCUIT) 2912 may be implemented in various forms such that the power receiving unit 291 generates resonance by a magnetic field, and is not limited to a form of being connected in series to the receiving coil 2911b as illustrated in FIG. 6.

The specific vibration frequency in the wireless power transmitter 100 may have $L_{TX}$, $C_{TX}$, and may be acquired by using the Equation 1. Here, the electronic device (or wireless power receiver) 200 generates resonance when a result of substituting the $L_{RX}$ and $C_{RX}$ of the electronic device (or wireless power receiver) 200 to the Equation 1 is same as the specific vibration frequency.

According to a contactless power transfer method by resonance coupling, when the wireless power transmitter 100 and electronic device (or wireless power receiver) 200 resonate at the same frequency, respectively, an electromagnetic wave is propagated through a short-range magnetic field, and thus there exists no energy transfer between the devices if they have different frequencies.

As a result, an efficiency of contactless power transfer by the resonance coupling method is greatly affected by a frequency characteristic, whereas the effect of an alignment and distance between the wireless power transmitter 100 and the electronic device (or wireless power receiver) 200 including each coil is relatively smaller than the inductive coupling method.

Hereinafter, the configuration of a wireless power transmitter and an electronic device in the resonance coupling method applicable to the embodiments disclosed herein will be described in detail.

Figure 7A:
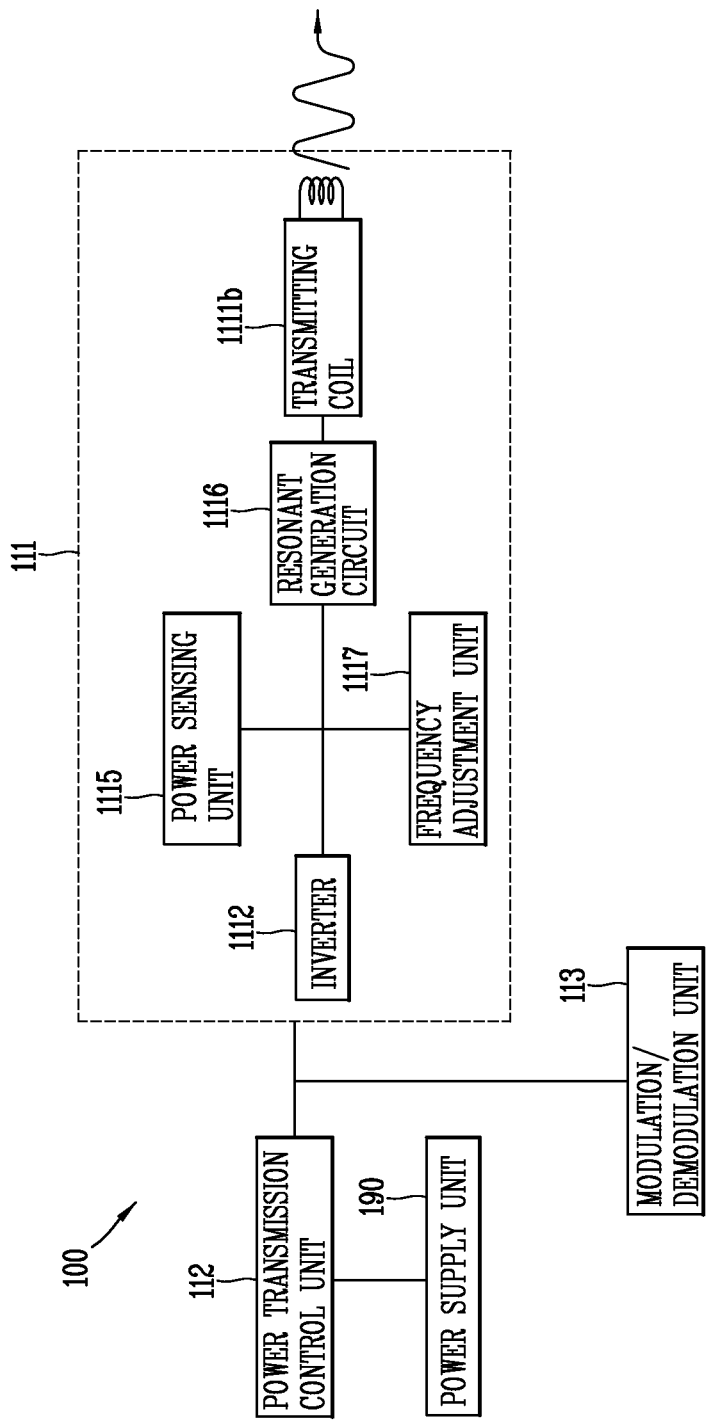
FIGS. 7A and 7B are block diagrams illustrating a configuration of a wireless power transmitter 100 and an electronic device 200 by a resonance method which can be applied to preferred embodiments of the present invention.
Figure 7B:
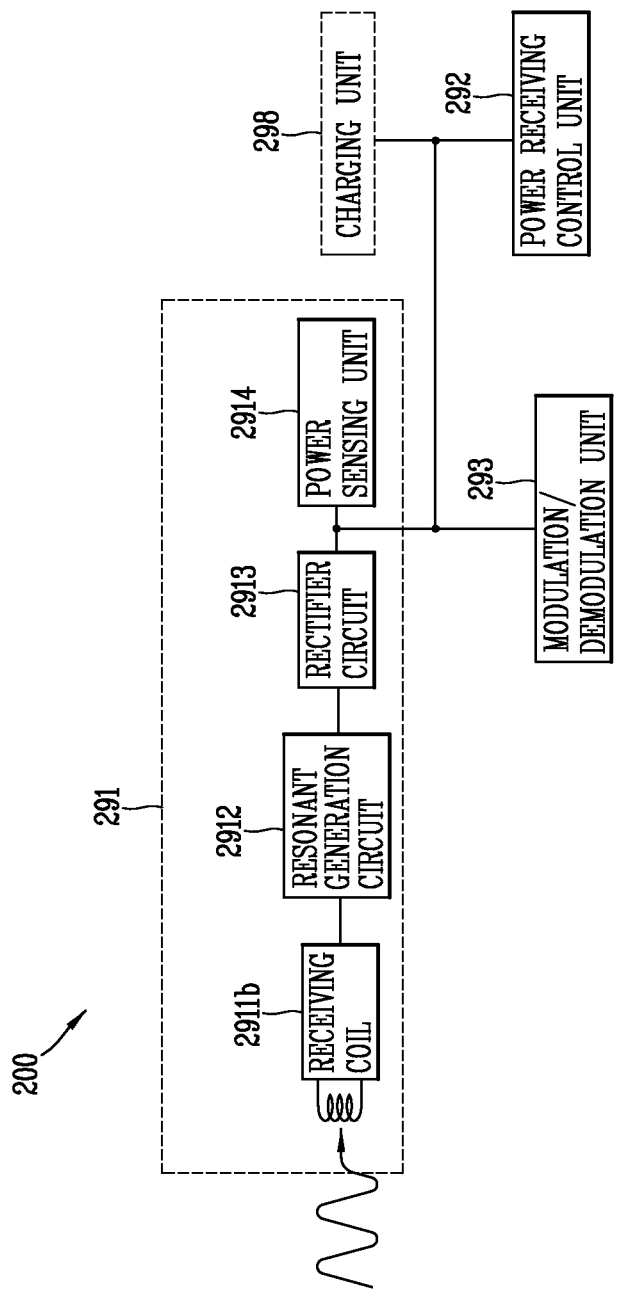

FIGS. 7A and 7B—Wireless Power Transmitter in Resonance Coupling Method

FIGS. 7A and 7B is a block diagram illustrating part of the wireless power transmitter 100 and electronic device (or wireless power receiver) 200 in a resonance method that can be employed in the embodiments disclosed herein.

A configuration of the power transmission unit 110 included in the wireless power transmitter 100 will be described with reference to FIG. 7A.

The power conversion unit 111 of the wireless power transmitter 100 may include a transmitting (Tx) coil 1111b, an inverter 1112, and a resonant circuit (or RESONANT GENERATION CIRCUIT) 1116. The inverter 1112 may be configured to be connected to the transmitting (Tx) coil 1111b and the resonant circuit (or RESONANT GENERATION CIRCUIT) 1116.

The transmitting (Tx) coil 1111b may be mounted separately from the transmitting (Tx) coil 1111a for transferring power according to the inductive coupling method, but may transfer power in the inductive coupling method and resonance coupling method using one single coil.

The transmitting (Tx) coil 1111b, as described above, forms a magnetic field for transferring power. The transmitting (Tx) coil 1111b and the resonant circuit (or RESONANT GENERATION CIRCUIT) 1116 generate resonance when alternating current power is applied thereto, and at this time, a vibration frequency may be determined based on an inductance of the transmitting (Tx) coil 1111b and a capacitance of the resonant circuit (or RESONANT GENERATION CIRCUIT) 1116.

For this purpose, the inverter 1112 transforms a DC input obtained from the power supply unit 190 into an AC waveform, and the transformed AC current is applied to the transmitting (Tx) coil 1111b and the resonant circuit (or RESONANT GENERATION CIRCUIT) 1116.

In addition, the power conversion unit 111 may further include a frequency adjustment unit 1117 for changing a resonant frequency of the power conversion unit 111. The resonant frequency of the power conversion unit 111 is determined based on an inductance and/or capacitance within a circuit constituting the power conversion unit 111 by Equation 1, and thus the power transmission control unit 112 may determine the resonant frequency of the power conversion unit 111 by controlling the frequency adjustment unit 1117 to change the inductance and/or capacitance.

The frequency adjustment unit 1117, for example, may be configured to include a motor for adjusting a distance between capacitors included in the resonant circuit (or RESONANT GENERATION CIRCUIT) 1116 to change a capacitance, or include a motor for adjusting a number of turns or diameter of the transmitting (Tx) coil 1111b to change an inductance, or include active elements for determining the capacitance and/or inductance On the other hand, the power conversion unit 111 may further include a power sensing unit 1115. The operation of the power sensing unit 1115 is the same as the foregoing description.

Referring to FIG. 7B, a configuration of the power supply unit 290 included in the electronic device (or wireless power receiver) 200 will be described. The power supply unit 290, as described above, may include the receiving (Rx) coil 2911b and resonant circuit (or RESONANT GENERATION CIRCUIT) 2912.

In addition, the power receiving unit 291 of the power supply unit 290 may further include a rectifier (or rectifying) circuit 2913 for converting an AC current generated by resonance phenomenon into DC. The rectifier (or rectifying) circuit 2913 may be configured similarly to the foregoing description.

Furthermore, the power receiving unit 291 may further include a power sensing unit 2914 for monitoring a voltage and/or current of the rectified power. The power sensing unit 2914 may be configured similarly to the foregoing description.

Figure 8:
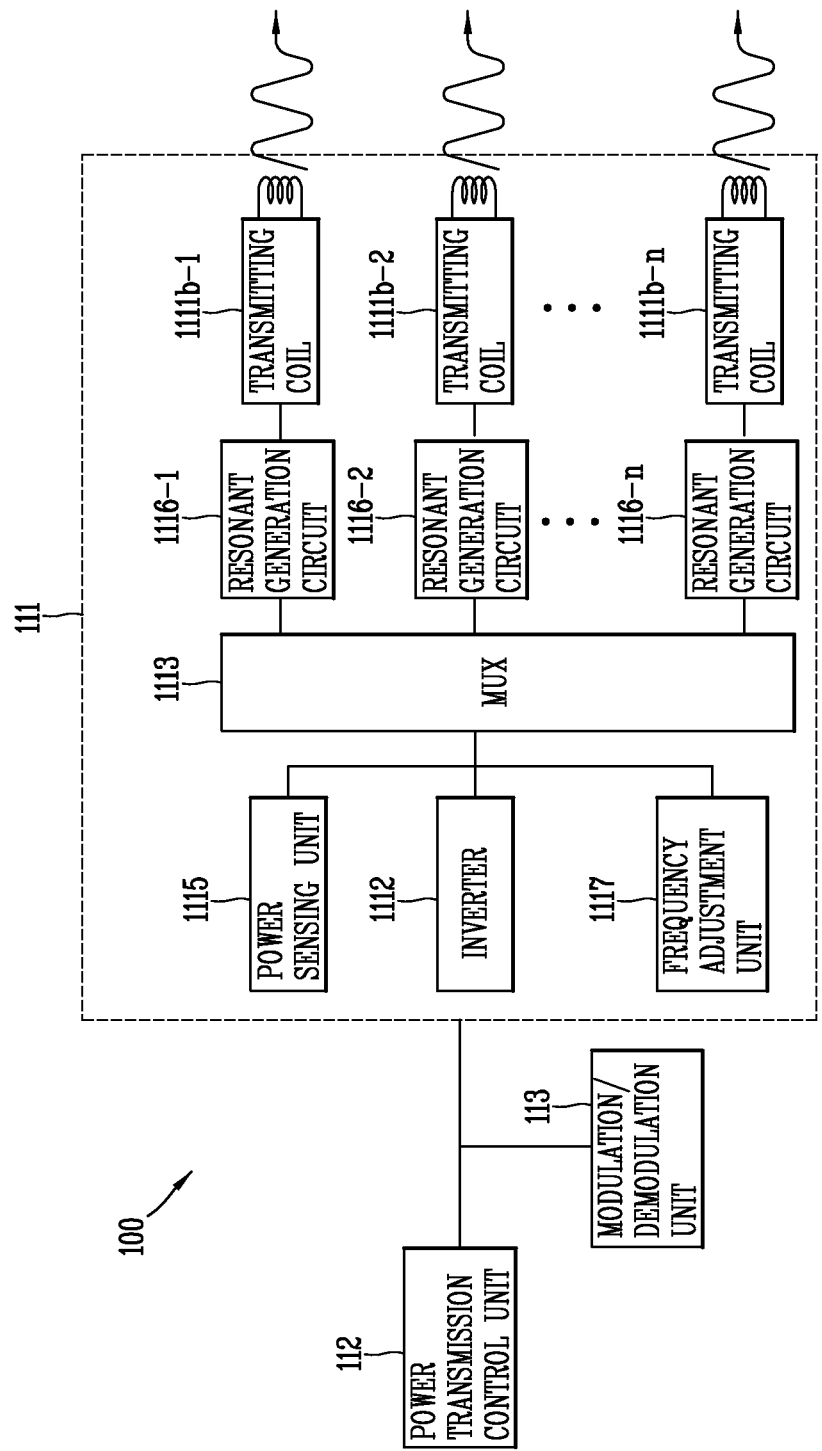
FIG. 8 is a block diagram of a wireless power transmitter having one or more transmitting coils for receiving power by a resonance coupling method which can be applied to embodiments of the present invention.

FIG. 8—Wireless Power Transmitter Configured to Include One or More Transmitting Coils FIG. 8 is a block diagram illustrating a wireless power transmitter configured to have one or more transmitting coils receiving power according to an resonance coupling method that can be employed in the embodiments disclosed herein.

Referring to FIG. 8, the power conversion unit 111 of the wireless power transmitter 100 according to the embodiments disclosed herein may include one or more transmitting coils 1111b-1 to 1111b-n and resonant (or RESONANT GENERATION) circuits (1116-1 to 1116-n) connected to each transmitting coils. Furthermore, the power conversion unit 111 may further include a multiplexer 1113 for establishing and releasing the connection of some of the one or more transmitting coils 1111b-1 to 1111b-n.

The one or more transmitting coils 1111b-1 to 1111b-n may be configured to have the same vibration frequency, or some of them may be configured to have different vibration frequencies. It is determined by an inductance and/or capacitance of the resonant (or RESONANT GENERATION) circuits (1116-1 to 1116-n) connected to the one or more transmitting coils 1111b-1 to 1111b-n, respectively.

In the meantime, when one or more electronic devices 200 are disposed in an active area or a detection area of the wireless power transmitter 100 including the one or more transmitting coils 1111b-1 to 1111b-n, the power transmission control unit 112 may control the multiplexer 1113 to allow the electronic devices to be placed in different resonance coupling relations. Accordingly, the wireless power transmitter 100 may wirelessly transfer power to the one or more electronic devices by generating the wireless power signal using different coils.

In addition, the power transmission control unit 112 may set power with a different characteristic to be supplied to each of the coils corresponding to the electronic devices. Here, the wireless power transmitter 100 may transfer power by differently setting a power transmission scheme, a resonant frequency, efficiency, a characteristic and the like for each electronic device. The power transmission for one or more electronic devices will be described later with reference to FIG. 28. For this purpose, the frequency adjustment unit 1117 may be configured to change an inductance and/or capacitance of the resonant circuits (1116-1 to 1116-n) connected to the one or more transmitting coils 1111b-1 to 1111b-n, respectively.

Figure 9:
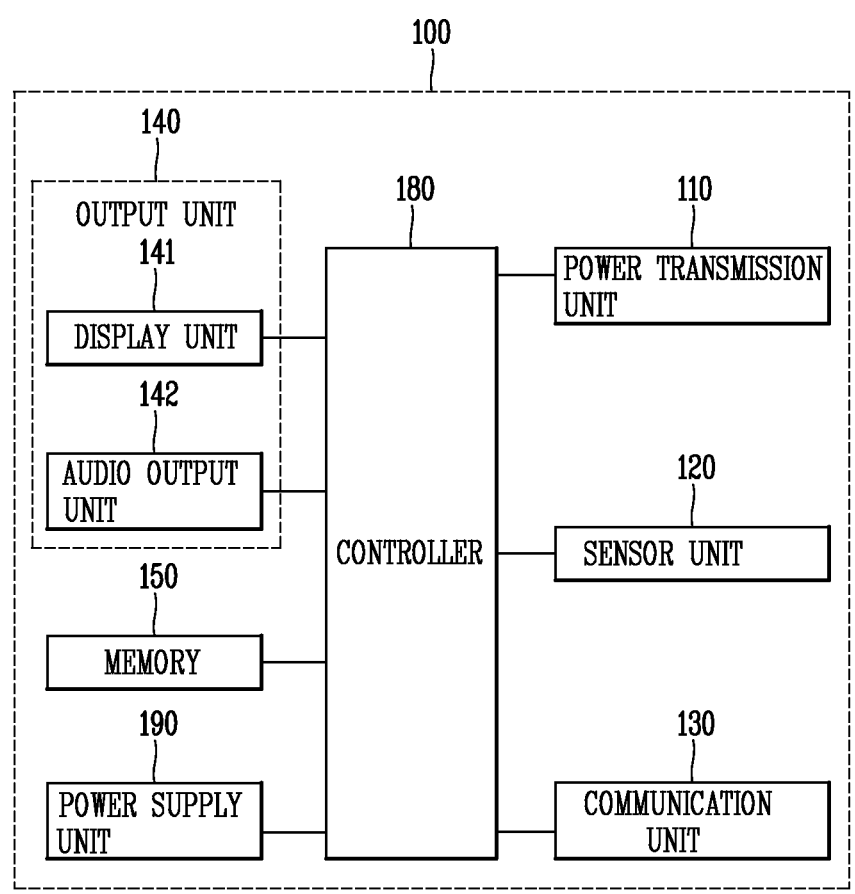
FIG. 9 is a block diagram of a wireless power transmitter having an additional configuration as well as a configuration of FIG. 2A.

FIG. 9—Wireless Power Transmitter Implemented by Charger

On the other hand, hereinafter, an example of the wireless power transmitter implemented in the form of a wireless charger will be described.

FIG. 9 is a block diagram illustrating a wireless power transmitter further including an additional element in addition to the configuration illustrated in FIG. 2A.

Referring to FIG. 9, the wireless power transmitter 100 may further include a sensor unit 120, a communication unit 130, an output unit 140, a memory 150, and a control unit (or Controller) 180 in addition to the power transmission unit 110 and power supply unit 190 for supporting at least one of the foregoing inductive coupling method and resonance coupling method.

The control unit (or Controller) 180 controls the power transmission unit 110, the sensor unit 120, the communication unit 130, the output unit 140, the memory 150, and the power supply unit 190.

The control unit (or Controller) 180 may be implemented by a module separated from the power transmission control unit 112 in the power transmission unit 110 described with reference to FIG. 2 or may be implemented by a single module.

The sensor unit 120 may include a sensor for detecting the location of the electronic device (or wireless power receiver) 200. The location information detected by the sensor unit 120 may be used for allowing the power transmission unit 110 to transfer power in an efficient manner.

For instance, in case of wireless power transfer according to the inductive coupling method, the sensor unit 120 may be operated as a detection unit, and the location information detected by the sensor unit 120 may be used to move or rotate the transmitting (Tx) coil 1111a in the power transmission unit 110.

Furthermore, for example, the wireless power transmitter 100 configured to include the foregoing one or more transmitting coils may determine coils that can be placed in an inductive coupling relation or resonance coupling relation to the receiving coil of the electronic device (or wireless power receiver) 200 among the one or more transmitting coils based on the location information of the electronic device (or wireless power receiver) 200.

On the other hand, the sensor unit 120 may be configured to monitor whether or not the electronic device (or wireless power receiver) 200 approaches a chargeable region. The approach or non-approach detection function of the sensor unit 120 may be carried out separately from the function of allowing the power transmission control unit 112 in the power transmission unit 110 to detect the approach or non-approach of the electronic device (or wireless power receiver) 200.

The communication unit 130 performs wired or wireless data communication with the electronic device (or wireless power receiver) 200. The communication unit 130 may include an electronic component for at least any one of Bluetooth™, Zigbee, Ultra Wide Band (UWB), Wireless USB, Near Field Communication (NFC), and Wireless LAN.

The output unit 140 may include at least one of a display unit 141 and an audio output unit (or SOUND OUTPUT UNIT) 142. The display unit 141 may include at least one of a liquid crystal display (LCD), a thin film transistor-liquid crystal display (TFT-LCD), an organic light-emitting diode (OLED), a flexible display, and a three-dimensional (3D) display. The display unit 141 may display a charging state under the control of the control unit (or Controller) 180.

The memory 150 may include at least one storage medium of a flash memory type, a hard disk type, a multimedia card micro type, a card type memory (e.g., SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disk, and the like. The wireless power transmitter 100 may operate in association with a web storage performing the storage function of the memory 150 on the Internet. A program or commands performing the foregoing functions of the wireless power transmitter 100 may be stored in the memory 150. The control unit (or Controller) 180 may perform the program or commands stored in the memory 150 to transmit power in a wireless manner. A memory controller (not shown) may be used to allow other constituent elements (e.g., control unit (or Controller) 180) included in the wireless power transmitter 100 to access the memory 150.

However, it would be easily understood by those skilled in the art that the configuration of a wireless power transmitter according to the embodiment disclosed herein may be applicable to an apparatus, such as a docking station, a terminal cradle device, and an electronic device, and the like, excluding a case where it is applicable to only a wireless charger.

Figure 10:
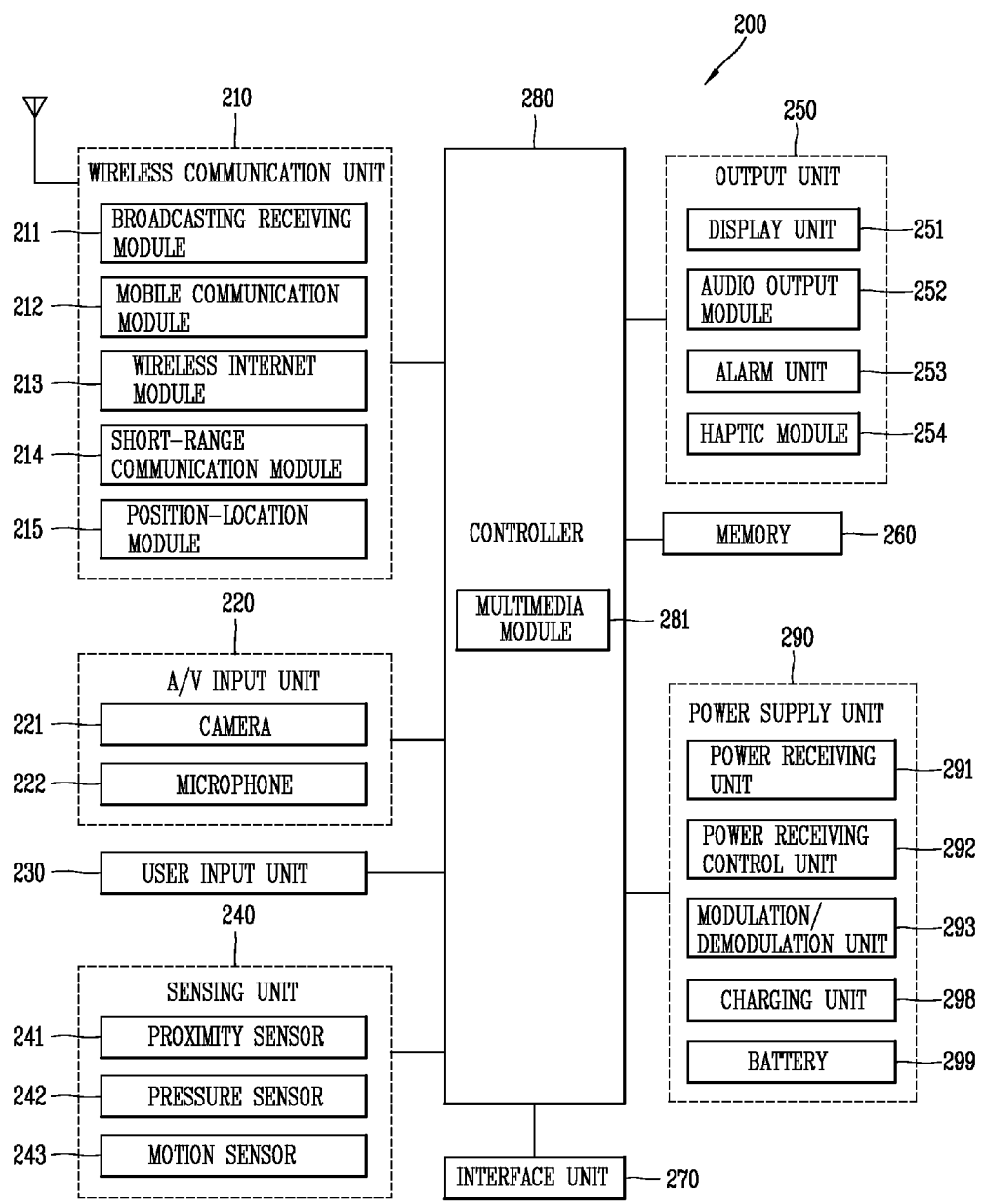
FIG. 10 is a view illustrating a case where an electronic device 200 according to embodiments of the present invention is implemented as a mobile terminal.

FIG. 10—Wireless Power Receiver Implemented with Mobile Terminal

FIG. 10 is view illustrating a configuration in case where an electronic device (or wireless power receiver) 200 according to the embodiments disclosed herein is implemented in the form of a mobile terminal.

The mobile communication terminal 200 may include a power supply unit 290 illustrated in FIG. 2, 4, or 7.

Furthermore, the terminal 200 may further include a wireless communication unit 210, an Audio/Video (A/V) input unit 220, a user input unit 230, a sensing unit 240, an output unit 250, a memory 260, an interface unit 270, and a controller 280. FIG. 10 illustrates the terminal 100 having various components, but it is understood that implementing all of the illustrated components is not a requirement. Greater or fewer components may alternatively be implemented.

Hereinafter, each component is described in sequence.

The wireless communication unit 210 may typically include one or more modules which permit wireless communications between the terminal 200 and a wireless communication system or between the terminal 200 and a network within which the terminal 200 is located. For example, the wireless communication unit 210 may include a broadcast receiving module 211, a mobile communication module 212, a wireless internet module 213, a short-range communication module 214, a position information module 215 and the like.

The broadcast receiving module 211 receives a broadcast signal and/or broadcast associated information from an external broadcast managing entity via a broadcast channel.

The broadcast channel may include a satellite channel and a terrestrial channel. The broadcast center may indicate a server which generates and transmits a broadcast signal and/or broadcast associated information or a server which receives a pre-generated broadcast signal and/or broadcast associated information and sends them to the portable terminal. The broadcast signal may be implemented as a TV broadcast signal, a radio broadcast signal, and a data broadcast signal, among others. The broadcast signal may further include a data broadcast signal combined with a TV or radio broadcast signal.

Examples of broadcast associated information may denote information associated with a broadcast channel, a broadcast program, a broadcast service provider, and the like. The broadcast associated information may be provided via a mobile communication network. In this case, it may be received by the mobile communication module 212.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 211 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T) and the like. The broadcast receiving module 211 may be configured to be suitable for every broadcast system transmitting broadcast signals as well as the digital broadcasting systems.

Broadcast signals and/or broadcast associated information received via the broadcast receiving module 211 may be stored in a suitable device, such as a memory 260.

The mobile communication module 212 transmits/receives wireless signals to/from at least any one of a base station, an external portable terminal, and a server on a mobile communication network. The wireless signal may include audio call signal, video (telephony) call signal, or various formats of data according to transmission/reception of text/multimedia messages.

The wireless internet module 213 supports wireless Internet access for the mobile terminal 200. This module may be internally or externally coupled to the terminal 100. Examples of such wireless Internet access may include Wireless LAN (WLAN) (Wi-Fi), Wireless Broadband (Wibro), Worldwide Interoperability for Microwave Access (Wimax), High Speed Downlink Packet Access (HSDPA) and the like.

The short-range communication module 214 denotes a module for short-range communications. Suitable technologies for implementing this module may include Bluetooth, Radio Frequency IDentification (RFID), Infrared Data Association (IrDA), Ultra-WideBand (UWB), ZigBee, and the like. On the other hand, Universal Serial Bus (USB), IEEE 1394, Thunderbolt of Intel technology, and the like, may be used for wired short-range communication.

The wireless internet module 213 or the short-range communication module 214 may establish data communication connection to the wireless power transmitter 100.

Through the established data communication, when there is an audio signal to be outputted while transferring power in a wireless manner, the wireless internet module 213 or the short-range communication module 214 may transmit the audio signal to the wireless power transmitter 100 through the short-range communication module. Furthermore, through the established data communication, when there is information to be displayed, the wireless internet module 213 or the short-range communication module 214 may transmit the information to the wireless power transmitter 100. Otherwise, the wireless internet module 213 or the short-range communication module 214 may transmit an audio signal received through a microphone integrated in the wireless power transmitter 100. Furthermore, the wireless internet module 213 or the short-range communication module 214 may transmit the identification information (e.g., phone number or device name in case of a portable phone) of the mobile terminal 200 to the wireless power transmitter 100 through the established data communication.

The position information module 215 is a module for acquiring a position of the terminal. An example of the position information module 215 may include a Global Position System (GPS) module.

Referring to FIG. 10, the NV input unit 220 is configured to provide audio or video signal input to the portable terminal. The AN input unit 220 may include a camera 221 and a microphone 222. The camera 221 processes image frames of still or moving images obtained by an image sensor in a video call mode or a capture more. The processed image frames may be displayed on the display unit 251.

The image frames processed by the camera 221 may be stored in the memory 260 or transmitted to the exterior via the wireless communication unit 210. Two or more cameras 221 may be provided therein according to the use environment.

The microphone 222 may receive an external audio signal by a microphone in a phone call mode, a recording mode, a voice recognition mode, or the like to process it into electrical audio data. The processed audio data is converted and outputted into a format transmittable to a mobile communication base station via the mobile communication module 212 in case of the phone call mode. The microphone 222 may include various noise removal algorithms to remove noises generated while receiving the external audio signal.

The user input unit 230 may generate input data to allow the user to control the operation of the terminal. The user input unit 230 may include a keypad, a dome switch, a touchpad (e.g., static pressure/capacitance), a jog wheel, a jog switch and the like.

The sensing unit 240 may include a proximity sensor 241, a pressure sensor 242, a motion sensor 243, and the like. The proximity sensor 241 detects an object approaching the mobile terminal 200, or the presence or absence of an object existing adjacent to the mobile terminal 200, and the like without any mechanical contact. The proximity sensor 241 may detect a proximity object using a change of the AC magnetic field or static magnetic field, a change rate of the electrostatic capacity, or the like. Two or more proximity sensors 241 may be provided according to the aspect of configuration.

The pressure sensor 242 may detect whether or not a pressure is applied to the mobile terminal 200, a size of the pressure, and the like. The pressure sensor 242 may be provided at a portion where the detection of a pressure is required in the mobile terminal 200 according to the use environment. When the pressure sensor 242 is provided in the display unit 251, it may be possible to identify a touch input through the display unit 251 and a pressure touch input by which a pressure larger than the touch input is applied according to a signal outputted from the pressure sensor 242. Furthermore, it may be possible to know a size of the pressure applied to the display unit 251 during the input of a pressure touch.

The motion sensor 243 detects the location or movement of the mobile terminal 200 using an acceleration sensor, a gyro sensor, and the like. The acceleration sensor used in the motion sensor 243 is an element for converting an acceleration change in any one direction into an electrical signal. Two or three axes are typically integrated into a package to constitute an acceleration sensor, and only one Z-axis may be required according to the use environment. Accordingly, when an acceleration sensor in the direction of X-axis or Y-axis should be used instead of the direction of Z-axis due to any reason, the acceleration sensor may be erected and mounted on a main substrate using a separate piece substrate. Furthermore, the gyro sensor is a sensor for measuring an angular speed of the mobile terminal 200 in a rotational movement to detect a rotated angle with respect to each reference direction. For instance, the gyro sensor may detect each rotational angle, i.e., azimuth, pitch and roll, with reference to three directional axes.

The output unit 250 is provided to output visual, auditory, or tactile information. The output unit 250 may include a display unit 251, an audio output module 252, an alarm unit 253, a haptic module 254, and the like.

The display unit 251 may display (output) information processed in the terminal 200. For example, when the terminal is in a phone call mode, the display unit 251 will provide a User Interface (UI) or Graphic User Interface (GUI) associated with the call. When the terminal is in a video call mode or a capture mode, the display unit 251 may display images captured and/or received, UI, or GUI.

The display unit 251 may include at least one of a liquid crystal display (LCD), a thin film transistor-liquid crystal display (TFT-LCD), an organic light-emitting diode (OLED), a flexible display, a three-dimensional (3D) display, and the like.

Some of those displays may be configured as a transparent type or an light transmission type through which the outside is visible, which is referred to as a transparent display. A representative example of the transparent display may include a Transparent OLED (TOLED), or the like. The rear surface of the display unit 151 may also be implemented to be optically transparent. Under this configuration, the user can view an object positioned at a rear side of the terminal body through a region occupied by the display unit 251 of the terminal body.

The display unit 251 may be implemented in two or more in number according to a configured aspect of the terminal 200. For instance, a plurality of the display units 251 may be arranged on one surface to be spaced apart from or integrated with each other, or may be arranged on different surfaces.

Here, if the display unit 251 and a touch sensitive sensor (referred to as a touch sensor) have a layered structure therebetween, the display unit 251 may be used as an input device rather than an output device. The touch sensor may be implemented as a touch film, a touch sheet, a touch pad, and the like.

The touch sensor may be configured to convert changes of a pressure applied to a specific part of the display unit 251, or a capacitance occurring from a specific part of the display unit 251, into electric input signals. Also, the touch sensor may be configured to sense not only a touched position and a touched area, but also a touch pressure.

When touch inputs are sensed by the touch sensors, corresponding signals are sent to a touch controller. The touch controller processes the received signals, and then transmits corresponding data to the controller 280. Accordingly, the controller 280 may sense which region of the display unit 151 has been touched.

The proximity sensor 241 may be arranged at an inner region of the terminal covered by the touch screen, or near the touch screen. The proximity sensor refers to a sensor to sense the presence or absence of an object approaching a surface to be sensed, or an object disposed near a surface to be sensed, using an electromagnetic field or infrared rays without a mechanical contact. The proximity sensor has a longer lifespan and a more enhanced utility than a contact sensor.

The proximity sensor may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Hereinafter, for the sake of brief explanation, a status that the pointer is positioned to be proximate onto the touch screen without contact will be referred to as a "proximity touch", whereas a status that the pointer substantially comes in contact with the touch screen will be referred to as a "contact touch". For the position corresponding to the proximity touch of the pointer on the touch screen, such position corresponds to a position where the pointer faces perpendicular to the touch screen upon the proximity touch of the pointer.

The proximity sensor senses proximity touch, and proximity touch patterns (e.g., distance, direction, speed, time, position, moving status, etc.). Information relating to the sensed proximity touch and the sensed proximity touch patterns may be output onto the touch screen.

The audio output module 252 may output audio data received from the wireless communication unit 210 or stored in the memory 260, in a call-receiving mode, a call-placing mode, a recording mode, a voice recognition mode, a broadcast reception mode, and so on. The audio output module 252 may output audio signals relating to functions performed in the terminal 200, e.g., sound alarming a call received or a message received, and so on. The audio output module 252 may include a receiver, a speaker, a buzzer, and so on.

The alarm 253 outputs signals notifying the occurrence of an event from the terminal 200. The event occurring from the terminal 100 may include call received, message received, key signal input, touch input, and so on. The alarm 253 may output not only video or audio signals, but also other types of signals such as signals notifying occurrence of events in a vibration manner. Since the video or audio signals can be output through the display unit 251 or the audio output unit 252, the display unit 251 and the audio output module 252 may be categorized into part of the alarm 253.

The haptic module 254 generates various tactile effects which a user can feel. A representative example of the tactile effects generated by the haptic module 254 includes vibration. Vibration generated by the haptic module 254 may have a controllable intensity, a controllable pattern, and so on. For instance, different vibration may be output in a synthesized manner or in a sequential manner.

The haptic module 254 may generate various tactile effects, including not only vibration, but also arrangement of pins vertically moving with respect to a skin being contacted, air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 254 may be configured to transmit tactile effects through the user's direct contact, or the user's muscular sense using a finger or a hand. The haptic module 254 may be implemented in two or more in number according to the configuration of the terminal 200.

The memory 260 may store a program for the processing and control of the controller 280. Alternatively, the memory 260 may temporarily store input/output data (e.g., phone-book data, messages, still images, video and the like). Also, the memory 260 may store data related to various patterns of vibrations and audio output upon the touch input on the touch screen.

In some embodiments, software components including an operating system (not shown), a module performing a wireless communication unit 210 function, a module operating together with the user input unit 230, a module operating together with the NV input unit 220, a module operating together with the output unit 250 may be stored in the memory 260. The operating system (e.g., LINUX, UNIX, OS X, WINDOWS, Chrome, Symbian, iOS, Android, VxWorks, or other embedded operating systems) may include various software components and/or drivers to control system tasks such as memory management, power management, and the like.

In addition, the memory 260 may store a setup program associated with contactless power transfer or wireless charging. The setup program may be implemented by the controller 280.

Furthermore, the memory 260 may store an application associated with contactless power transfer (or wireless charging) downloaded from an application providing server (for example, an app store). The wireless charging related application is a program for controlling wireless charging transmission, and thus the electronic device (or wireless power receiver) 200 may receive power from the wireless power transmitter 100 in a wireless manner or establish connection for data communication with the wireless power transmitter 100 through the relevant program.

The memory 260 may be implemented using any type of suitable storage medium including a flash memory type, a hard disk type, a multimedia card micro type, a memory card type (e.g., SD or xD memory), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disk, and the like. Also, the terminal 200 may be operated in association with a web storage performing the storage function of the memory 150 on the Internet.

The interface unit 270 may generally be implemented to interface the portable terminal with all external devices. The interface unit 270 may allow a data reception from an external device, a power delivery to each component in the terminal 200, or a data transmission from the terminal 200 to an external device. The interface unit 270 may include, for example, wired/wireless headset ports, external charger ports, wired/wireless data ports, memory card ports, ports for coupling devices having an identification module, audio input/output (I/O) ports, video input/output (I/O) ports, earphone ports, and the like.

The identification module may be configured as a chip for storing various information required to authenticate an authority to use the terminal 200, which may include a User Identity Module (UIM), a Subscriber Identity Module (SIM), and the like. Also, the device having the identification module (hereinafter, referred to as "identification device") may be implemented in a type of smart card. Hence, the identification device can be coupled to the terminal 200 via a port.

Also, the interface unit may serve as a path for power to be supplied from an external cradle to the terminal 200 when the terminal 100 is connected to the external cradle or as a path for transferring various command signals inputted from the cradle by a user to the terminal 200. Such various command signals or power inputted from the cradle may operate as signals for recognizing that the terminal 200 has accurately been mounted to the cradle.

The controller 280 typically controls the overall operations of the terminal 200. For example, the controller 280 performs the control and processing associated with telephony calls, data communications, video calls, and the like. The controller 280 may include a multimedia module 281 for multimedia playback. The multimedia module 281 may be implemented within the controller 280, or implemented separately from the controller 280.

The controller 280 can perform a pattern recognition processing so as to recognize a writing input or image drawing input carried out on the touch screen as a text or image.

The controller 280 performs wired or wireless charging according to the user input or internal input. Here, the internal input represents a signal for notifying that an induced current generated from a secondary coil within the terminal has been detected.

When the foregoing wireless charging is carried out, an operation of allowing the controller 280 to control each constituent element will be described in detail below with reference to the operation phase in FIG. 14. As described above, the Power reception control unit (or POWER RECEIVING CONTROL UNIT) 292 within the power supply unit 290 may be implemented to be included in the controller 280, and in the present disclosure, it should be understood that the controller 280 performs the operation by the Power reception control unit (or POWER RECEIVING CONTROL UNIT) 292.

The power supply unit 290 receives internal and external power under the control of the controller 280 to supply power required for the operation of each constituent element.

The power supply unit 290 is provided with a battery 299 for supplying power to each constituent element of the terminal 200, and the battery 299 may include a charger (or charging unit) 298 for performing wired or wireless charging.

The present disclosure discloses a mobile terminal as an example of the apparatus for receiving power in a wireless manner, but it would be easily understood by those skilled in the art that the configuration according to the embodiment disclosed herein may be applicable to a stationary terminal, such as a digital TV, a desktop computer, and the like, excluding a case where it is applicable to only the mobile terminal.

Hereinafter, a configuration of a mobile terminal, to which a wireless power receiver has been applied, will be explained in more detail with reference to FIGS. 11 to 13.

Figure 11:
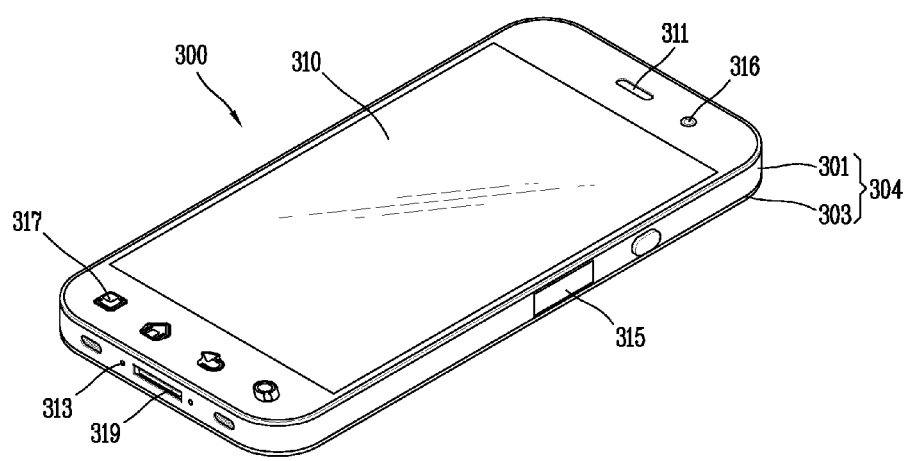
FIG. 11 is a front perspective view of a mobile terminal according to an embodiment of the present invention.
Figure 12:
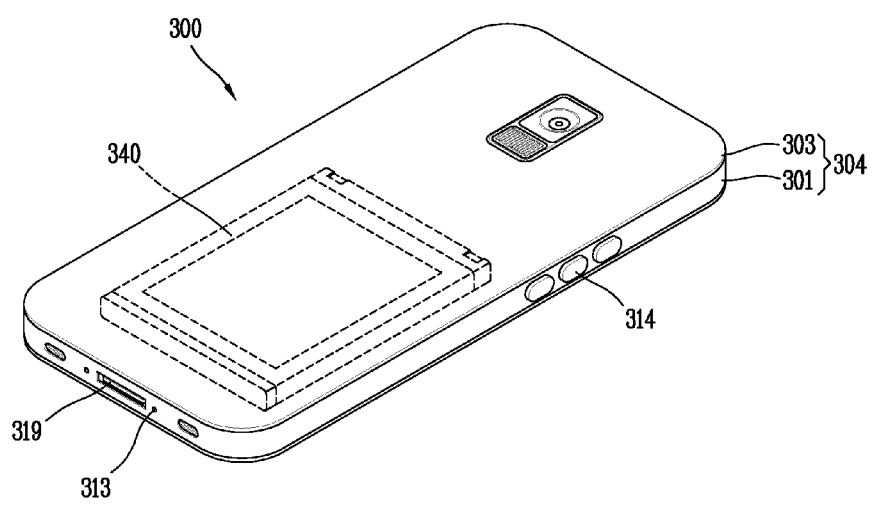
FIG. 12 is a rear perspective view of the mobile terminal of FIG. 11.

FIG. 11 is a front perspective view of a mobile terminal according to an embodiment of the present invention, and FIG. 12 is a rear perspective view of the mobile terminal of FIG. 11.

Referring to FIGS. 11 and 12, the mobile terminal 300 according to the present invention is provided with a bar type terminal body 304. However, the present invention is not limited to this, but may be applied to a slide type in which two or more bodies are coupled to each other so as to perform a relative motion, a folder type, a swing type, and the like. Further, the mobile terminal of the present invention may be applied to any portable electronic device having a camera and a flash, for instance, a portable phone, a smart phone, a notebook computer, a digital broadcasting terminal, Personal Digital Assistants (PDAs), Portable Multimedia Players (PMO), etc.

The mobile terminal 300 includes a terminal body 304 which forms the appearance thereof.

A case (casing, housing, cover, etc.) which forms the appearance of the terminal body 304 may include a front case 301, a rear case 302, and a battery cover 303 for covering the rear surface of the rear case 302.

A space formed by the front case 301 and the rear case 302 may accommodate various components therein. Such cases may be formed by injection-molded synthetic resin, or may be formed using a metallic material such as stainless steel (STS) or titanium (Ti).

On the front surface of the terminal body 304, may be disposed a display unit 310, a first audio output unit 311, a front camera 316, a side key 314, an interface unit 315, and a user input unit 317.

The display unit 310 includes a liquid crystal display (LCD) module, organic light emitting diodes (OLED) module, e-paper, etc., each for visually displaying information. The display unit 310 may include a touch sensing means for inputting information in a touch manner. Hereinafter, the display unit 310 including the touch sensing means is called 'touch screen'. Once part on the touch screen 310 is touched, content corresponding to the touched position is input. The content input in a touch manner, may be characters, or numbers, or menu items which can be set in each mode. The touch sensing means may be transmissive so that the display can be viewed, and may include a structure for enhancing visibility of the touch screen at a bright place. Referring to FIG. 2, the touch screen 310 occupies most of the front surface of the front case 301.

The first audio output unit 311 may be implemented as a receiver for transmitting a call sound to a user's ear, or a loud speaker for outputting each type of alarm sound or a playback sound of multimedia.

The front camera 316 processes image frames such as still images or moving images, acquired by an image sensor in a video call mode or a capturing mode. The processed image frames may be displayed on the display unit 310.

The image frames processed by the front camera 316 may be stored in the memory 150, or may be transmitted to outside through the wireless communication unit 110. The front camera 316 may be implemented in two or more according to a user's interface.

The user input unit 317 is manipulated to receive a command for controlling the operation of the mobile terminal 300, and may include a plurality of input keys. The input keys may be referred to as manipulation portions, and may include any type of ones that can be manipulated in a user's tactile manner.

For instance, the user input unit 317 may be implemented as a dome switch, or a touch screen, or a touch pad for inputting commands or information in a user's push or touch manner. Alternatively, the user input unit 317 may be implemented, for example, as a wheel for rotating a key, a jog, or a joystick. The user input unit 317 is configured to input various commands such as START, END and SCROLL.

A side key 314, an interface unit 315, an audio input unit 313, etc. are disposed on the side surface of the front case 301.

The side key 314 may be called 'manipulation unit', and may be configured to receive commands for controlling the operation of the mobile terminal 300. The side key 314 may include any type of ones that can be manipulated in a user's tactile manner. Content input by the side key 314 may be variously set. For instance, through the side key 314, may be input commands such as controlling the front and rear cameras 316 and 221, controlling the level of sound output from the audio output unit 311, and converting a current mode of the display unit 310 into a touch recognition mode.

The audio output unit 313 may be implemented as a microphone for receiving a user's voice, other sound, etc.

The interface unit 315 serves a path through which the mobile terminal 300 performs data exchange, etc. with an external device. For example, the interface unit 315 may be at least one of a connection terminal through which the mobile terminal 300 is connected to an ear phone by cable or radio, a port for local area communication, e.g., an infrared data association (IrDA) port, a Bluetooth portion, a wireless LAN port, and power supply terminals for supplying power to the mobile terminal 300. The interface unit 315 may be a card socket for accommodating an external card such as a subscriber identification module (SIM) card, a user identity module (UIM) card or a memory card for storing information.

A power supply unit 340 and the rear camera 321 are disposed on the rear surface of the body 304.

A flash 322 and a mirror (not shown) may be disposed close to the rear camera 321. When capturing an object by using the rear camera 321, the flash 322 provides light onto the object.

When the user captures an image of himself/herself by using the rear camera 321, the mirror can be used for the user to look at himself/herself therein.

The rear camera 321 may face a direction which is opposite to a direction faced by the front camera 316, and may have different pixels from those of the front camera 316.

For example, the front camera 316 may operate with relatively lower pixels (lower resolution). Thus, the front camera 316 may be useful when a user can capture his face and send it to another party during a video call or the like. On the other hand, the rear camera 321 may operate with a relatively higher pixels (higher resolution) such that it can be useful for a user to obtain higher quality pictures for later use. The front camera 316 and the rear camera 321 may be installed at the terminal body 304 so as to rotate or pop-up.

The power supply unit 340 is configured to supply power to the mobile terminal 300. The power supply unit 340 may be mounted in the terminal body 304, or may be detachably mounted to the terminal body 304.

Figure 13:
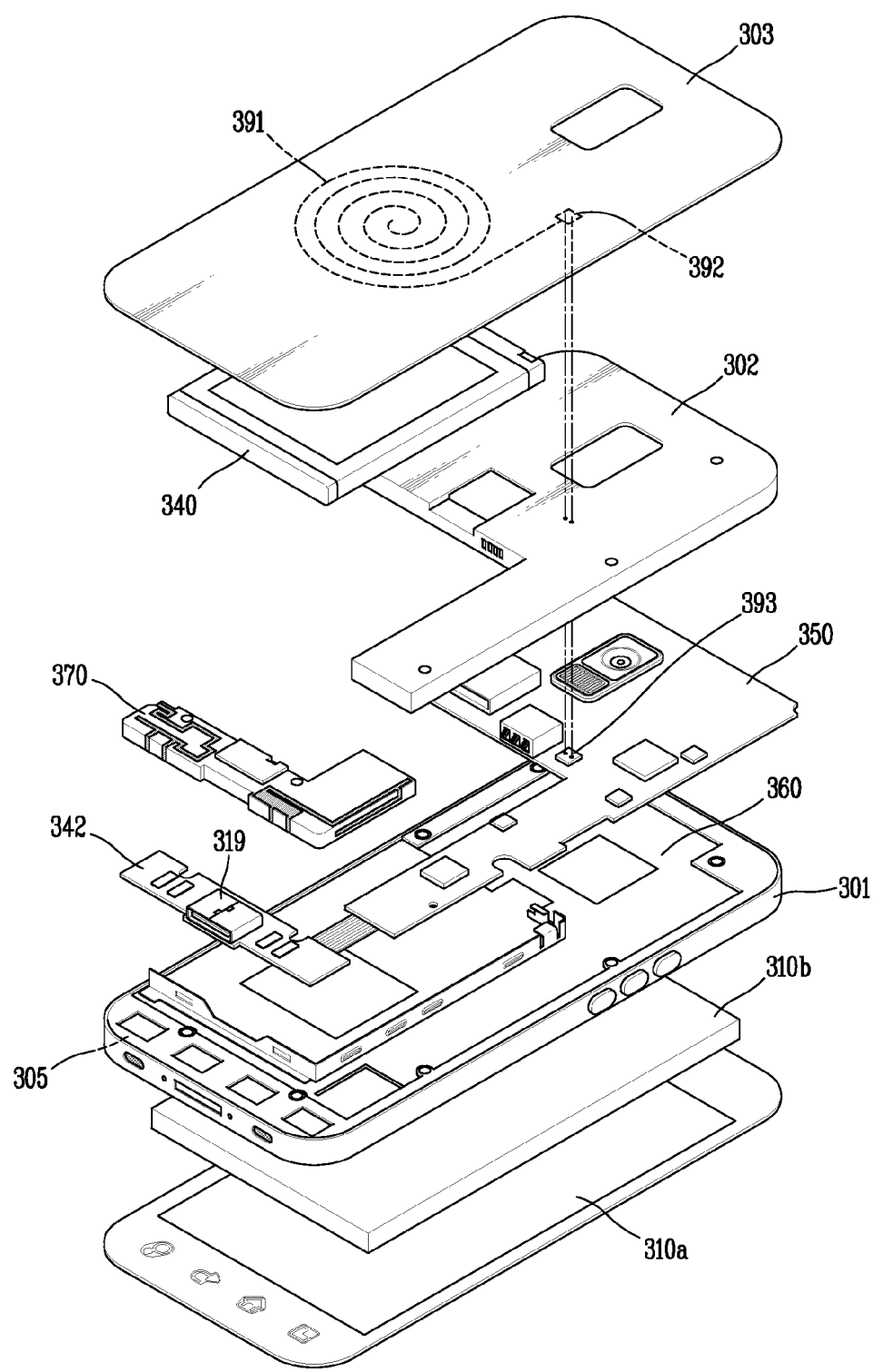
FIG. 13 is an exploded perspective view of FIG. 12.

FIG. 13 is an exploded perspective view of FIG. 12.

Referring to FIG. 13, the mobile terminal comprises a window 310a and a display module 310b which constitute the display unit 310. The window 310a may be coupled to one surface of the front case 301. The window 310a and the display module 310b may be integrally formed with each other.

A frame 360, which is configured to support electric devices, is formed between the front case 301 and the rear case 302. The frame 360, which is configured to support inside of the mobile terminal, supports at least one of the display module 310b, the rear camera 321, an antenna device, the battery 340 and a circuit board 350.

The frame 360 may be formed such that part thereof is exposed to outside. The frame 360 may constitute part of a sliding module which connects a body portion and a display portion to each other in a slide type mobile terminal rather than a bar type mobile terminal.

Referring to FIG. 13, the circuit board 350 is disposed between the frame 360 and the rear case 302, and the display module 310b is coupled to one surface of the frame 360. The circuit board 350 and the battery are disposed on another surface of the frame 360, and a battery case 303 for covering the battery may be coupled to the rear case 302.

The window 310a is coupled to one surface of the front case 301. A touch sensitive pattern 310c may be formed on one surface of the window 310a. The touch sensitive pattern 310c is configured to sense a touch input, and is formed of a transmissive material. The touch sensitive pattern 310c is mounted to a front surface of the window 310a, and is configured to convert a change of a voltage, etc. occurring on a specific part of the window 310a, into an electric input signal.

The display module 310b is mounted to a rear surface of the window 310a. In this embodiment, the display module 310b is implemented as a thin film transistor-liquid crystal display (TFT-LCD). However, the present invention is not limited to this.

For instance, the display module 310b may be implemented as a liquid crystal display (LCD), an organic light-emitting diode (OLED), a flexible display, a 3D display, etc.

The circuit board 350 may be formed on one surface of the frame 360 as aforementioned, but may be mounted below the display module 310b. One or more electronic devices are mounted to a lower surface of the circuit board 350.

A battery accommodation unit for accommodating the battery 340, is recessed from the frame 360. A contact unit 319, which is connected to the circuit board 350 so that the battery 340 can supply power to the terminal body, may be formed on one side surface of the battery accommodation unit.

An antenna device may be formed on an upper or lower end of the mobile terminal. Alternatively, the antenna device may be formed in plurality, and the plurality of antenna devices may be disposed on the upper end and the lower end of the mobile terminal, respectively. In this case, the antenna devices may be configured to transmit and receive (transmit) radio signals in different frequency bands. Such antenna device may comprise conductive patterns formed on one surface of a carrier 370.

The frame 360 may be formed of a metallic material for high intensity despite its small thickness. The frame 360 formed of a metallic material may operate as a ground. That is, the circuit board 350 or the antenna device may be ground-connected to the frame 360, and the frame 360 may operate as a ground of the circuit board 350 or the antenna device. In this case, the frame 360 may extend a ground of the mobile terminal.

The circuit board 350 is electrically connected to the antenna device, and is configured to process radio signals (or radio electromagnetic waves) transceived by the antenna device. For processing of radio signals, a plurality of transceiver circuits may be mounted to the circuit board 350.

The transceiver circuits may comprise one or more integrated circuits and related electric devices. For instance, the transceiver circuits may include a transmission integrated circuit, a reception integrated circuit, a switching circuit, an amplifier, etc.

As the plurality of transceiver circuits simultaneously feed conductive members serving as radiators, the plurality of antenna devices may simultaneously operate. For instance, while one of the transceiver circuits performs a transmission function, another thereof may perform a reception function. Alternatively, both of the transceiver circuits may perform a transmission function or a reception function.

A coaxial cable may be formed to connect the circuit board with each antenna device. For instance, the coaxial cable may be connected to feeding devices for feeding antenna devices. The feeding devices may be formed on one surface of a flexible printed circuit board (FPCB) 342 for processing signals input from the user input unit 317. Another surface of the FPCB 342 may be coupled to a signal transmission unit for transmitting signals from the user input unit 317. In this case, a dome may be formed on another surface of the FPCB 342, and an actuator may be formed at the signal transmission unit.

In the present invention, the battery 340 may be charged using an adaptor 400 (refer to FIG. 14) coupled to the wireless power transmitter 100 (refer to FIG. 1) and the contact unit 319.

Figure 14:
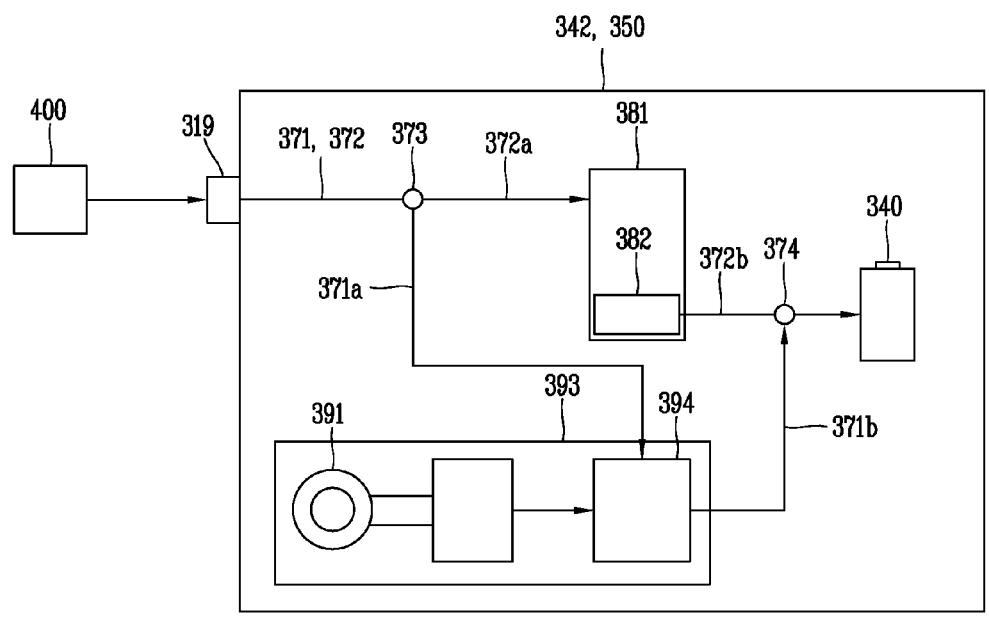
FIG. 14 is a block diagram illustrating a configuration of charging units and conductive lines of a mobile terminal according to a preferred embodiment of the present invention.

A power supply unit 393 (refer to FIG. 14), which receives power from the wireless power transmitter 100, may comprise a power receiving unit 391 (refer to FIG. 14) and a first charging unit 394 (refer to FIG. 14). The power receiving unit 391 may be partially or wholly formed at a case (rear case or battery case) for covering the battery 340. The first charging unit 394 may be formed at the circuit board 350, and the power receiving unit 391 and the first charging unit 394 may be connected to each other by a contact member. Alternatively, both of the power receiving unit 391 and the first charging unit 394 may be formed at the case.

FIG. 14 is a block diagram illustrating a configuration of charging units and conductive lines of a mobile terminal according to a preferred embodiment of the present invention.

Referring to FIGS. 11 and 14, the battery 340 is accommodated in the terminal body 304. The contact unit 319, to which the adaptor 400 is coupled, is formed at one side of the terminal body 304. The adaptor 400 may be implemented as a travel adaptor (TA), a charging device for a mobile terminal. Alternatively, the adaptor 400 may be implemented as various means configured to connect the contact unit 319 with power, and configured to charge the battery 340 of the mobile terminal with a prescribed voltage and current.

The mobile terminal is provided with a plurality of charging units. The plurality of charging units may be a second charging unit 382 included in a power management IC (PMIC) 381, and a first charging unit 394 included in a power supply unit 393 configured to wirelessly receive power from the wireless power transmitter.

Conductive lines 371 and 372 are formed to connect the contact unit 319 with the battery 340. As an example, the conductive lines may be implemented as conductive patterns formed on a printed circuit board.

The plurality of conductive lines 371 and 372 may be formed to pass through charging units 382 and 394 for charging the battery 340, respectively.

In a case where the plurality of conductive lines comprise a first conductive line 371 and a second conductive line 372, the first conductive line 371 may be formed to pass through the first charging unit 394, and the second conductive line 372 may be formed to pass through the second charging unit 382.

Hereinafter, will be explained a case where the plurality of conductive lines comprise a first conductive line 371 and a second conductive line 372.

The first conductive line 371 and the second conductive line 372 are diverged from each other at a first point 373, and are converged with each other at a second point 374. The first conductive line 371 between the first point 373 and the second point 374 is called a first diverged conductive line 371a-371b, and the second conductive line 372 between the first point 373 and the second point 374 is called a second diverged conductive line 372a-372b. Referring to FIG. 14, the first diverged conductive line 371a-371b may be formed to pass through the first charging unit 394, and the second diverged conductive line 372a-372b may be formed to pass through the second charging unit 382. Under such configuration, time taken to charge the mobile terminal can be reduced by the plurality of charging units 382 and 394.

In the present invention, as resistances are arranged in parallel, the amount of heat generation can be reduced. Generally, the first charging unit 394 which constitutes the power supply unit is expensive, and has higher wireless charging efficiency than the second charging unit 382 of a PMIC. As an example, if the first charging unit 394 has 90% of output ratio with respect to input, the second charging unit 382 has about 85% of output ratio with respect to input. From a resistance perspective, an entire resistance of the first diverged conductive line 371a-371b including the first charging unit 394 is lower than that of the second diverged conductive line 372a-372b including the second charging unit 382.

More specifically, if the entire resistance of the first diverged conductive line 371a-371b is A ohm, the entire resistance of the second diverged conductive line 372a-372b is B ohm higher than A. In this case, a combined resistance of the first conductive line 371 and the second conductive line 372 is $A*B/(A+B)$ ohm. That is, in the mobile terminal having a single charging path, a resistance of the first diverged conductive line 371a-371b and the second diverged conductive line 372a-372b is B ohm. However, in the present invention, a combined resistance of the first diverged conductive line 371a-371b and the second diverged conductive line 372a-372b is $A*B/(A+B)$ ohm lower than B ohm. Accordingly, the amount of heat generation from the mobile terminal can be smaller than in a case where a single charging path is implemented.

Further, a voltage drop occurring from the first diverged conductive line 371a-371b and the second diverged conductive line 372a-372b may be lower than in a case where a single charging path is implemented.

Such advantages of the mobile terminal will be explained in more detail with reference to FIG. 15.

Figure 15:
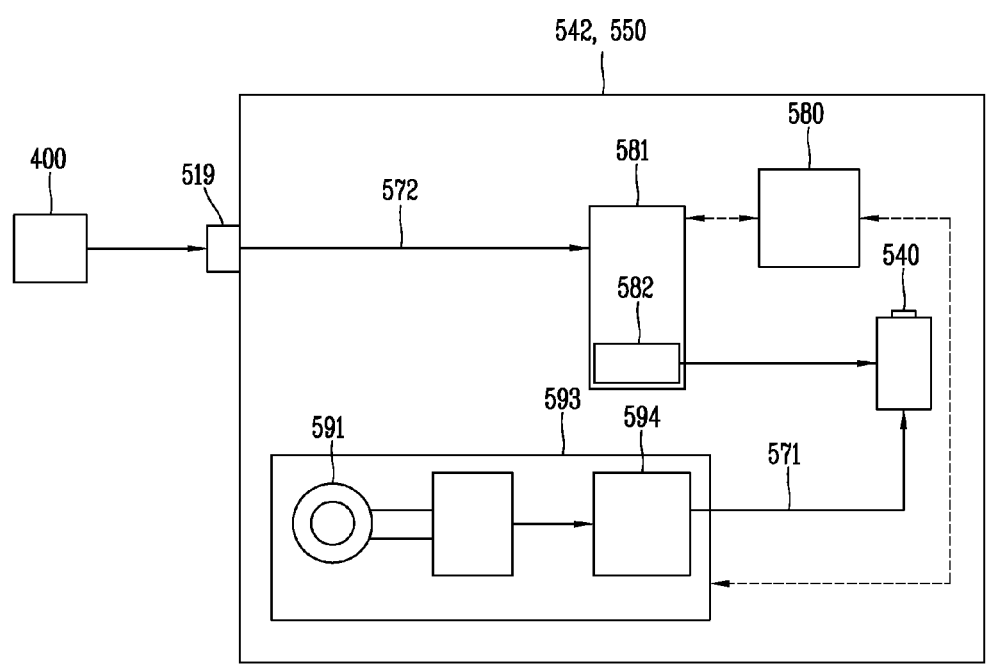
FIG. 15 is a block diagram illustrating a configuration of charging units and conductive lines of a mobile terminal according to a comparative embodiment of the present invention.
Figure 16:
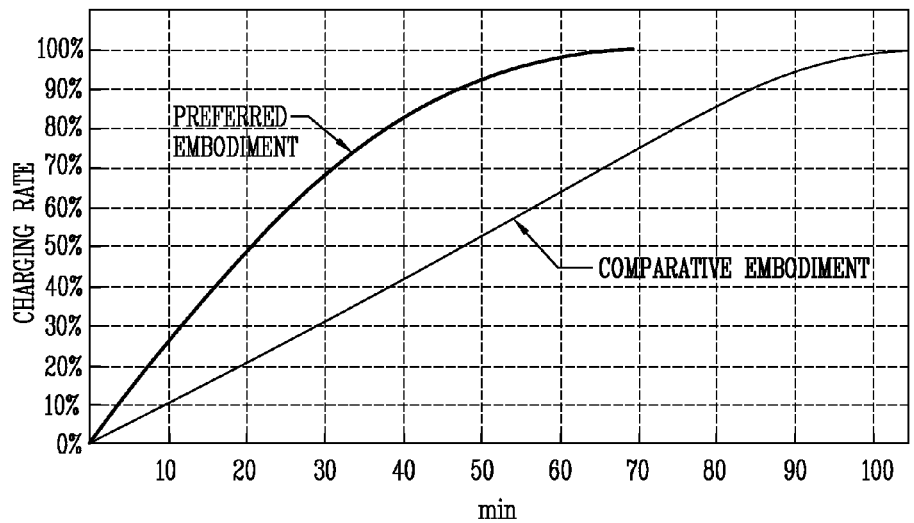
FIG. 16 is a graph comparing a charging efficiency of a mobile terminal according to a preferred embodiment, with that according to a comparative embodiment.

FIG. 15 is a block diagram illustrating a configuration of charging units and conductive lines of a mobile terminal according to a comparative embodiment of the present invention. FIG. 16 is a graph comparing a charging efficiency of a mobile terminal according to a preferred embodiment, with that according to a comparative embodiment.

Referring to FIG. 15, in a mobile terminal according to a comparative embodiment, a wired charging is performed on a single charging path from a contact unit 519 to a battery 540. A single conductive line 572 is provided to connect the contact unit 519 to which the adaptor 400 is coupled, with the battery 540. The conductive line 572 is formed to pass through a second charging unit 582 of a power management IC (PMIC) 581.

In a case where a mobile terminal according to a comparative embodiment is configured to perform a wireless charging, a first charging unit 594 for wirelessly receiving power from a wireless power transmitter, and a power receiving unit 591 may be mounted to the mobile terminal. In this case, the mobile terminal may be provided with a first path connected from the power receiving unit 591 to the battery 540 via the first charging unit 594, and a second path connected from the contact unit 519 to the battery 540 via the second charging unit 582 of the PMIC 581. As the first path does not extend up to the contact unit 519, the contact unit 519 and the battery 540 have a single charging path.

A resistance, a current and a voltage drop of the mobile terminal having a single charging path according to a comparative embodiment, will be compared with those of the mobile terminal having a plurality of charging paths according to a preferred embodiment as follows.

In this comparative embodiment, the length of the conductive lines, etc. were the same as those of the preferred embodiment. A voltage supplied to the contact unit 519 using the adaptor 400 is 5.5V, and a current is 3 A.

TABLE

|  |  | Charging Current | Entire Resistance | Combined Resistance | Voltage Drop | Required Minimum Voltage |
|---|---|---|---|---|---|---|
|  | Comparative Embodiment | 3 A | 0.584 ohm | 0.584 ohm | 1.752 V | 6.102 V |
| Preferred Embodiment | First Diverged Conductive Line | 1.78 A | 0.398 ohm | 0.245 ohm | 0.708 V | 5.058 V |
|  | Second Diverged Conductive Line | 1.22 A | 0.584 ohm |  | 0.712 V | 5.062 V |

As can be seen from the above table, if a plurality of charging paths are formed from the contact unit 319 to the battery 340, a resistance is lowered between the first point 373 and the second point 374, by 0.245 ohm than that of the comparative embodiment, due to a combined resistance of the first diverged conductive line 371a-371b and the second diverged conductive line 372a-372b. Further, in this preferred embodiment, a voltage drop is reduced to 0.712V from 1.752V. Under such configuration, even if a maximum voltage required to charge the battery 340 is about 5V, the battery 340 can be charged. Accordingly, the battery 340 of the mobile terminal according to the preferred embodiment can be charged using the adaptor 400 of high compatibility.

In the comparative embodiment, the amount of heat generation is 0.102 mW between the contact unit 519 and the battery 540. However, in the preferred embodiment, the amount of heat generation is 0.0698 mW (0.0282 mW+0.0416 mW), which is reduced by maximum 30%.

As shown in FIG. 16, the mobile terminal having a plurality of charging paths is charged for a shorter time, when using the adaptor 400 having a voltage of 5.5V and a current of 3 A.

The mobile terminal according to a preferred embodiment of the present invention may further comprise: a switch 375 configured to connect the contact unit 319 with at least one of the conductive lines 371 and 372; and a controller 380 configured to control an operation of the switch 375 or the charging units 382 and 394. Under such configuration, the charging units 382 and 394 independently operate so that heat generation from the mobile terminal can be effectively controlled. The controller 380 may be implemented in plurality, and one of the plurality of controllers may be a driving chip such as an application processor (AP).

Figure 17:
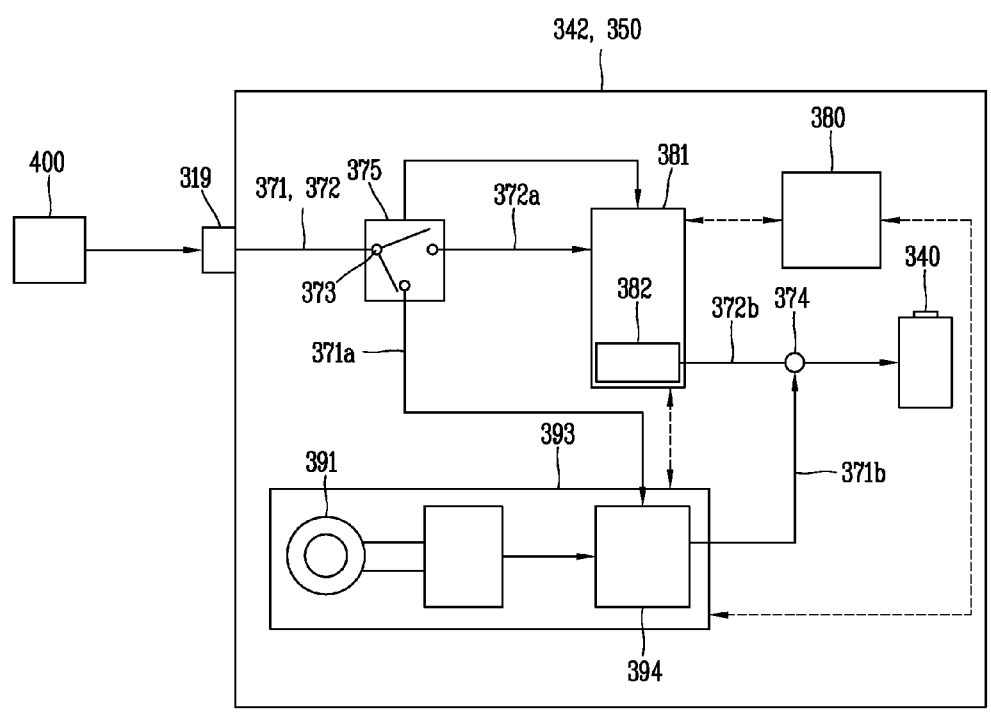
FIG. 17 is a block diagram illustrating an example to control charging units and conductive lines of a mobile terminal according to a preferred embodiment of the present invention.

Heat generation from the mobile terminal will be explained in more detail with reference to FIG. 17. FIG. 17 is a block diagram illustrating an example to control the charging units 382 and 394 and the conductive lines 371 and 372 of the mobile terminal according to a preferred embodiment of the present invention. In FIG. 17, the solid line indicates a path of a current for charging the battery 340, and the dotted line indicates a signal transmission path of the controller 380 which controls the charging units 382 and 394 and the switch 375.

In the mobile terminal having a single charging path according to a comparative embodiment, if the temperature of the battery or the charging units increases by charging, power supply to the charging units or the battery may be controlled for control of heat generation.

However, when applying such control method, a charging time increases because a charging operation is not performed until before the mobile terminal is cooled to a value lower than a prescribed temperature.

On the contrary, in the preferred embodiment, heat generation from the mobile terminal can be effectively controlled using the controller 380 and the switch 375.

In the present invention, the switch 375 is formed at the first point 373 where the first conductive line 371 and the second conductive line 372 are diverged from each other. In response to a signal from the controller 380, the switch 375 may electrically connect one of the conductive lines with the contact unit 319, or release the connected state between one of the conductive lines with the contact unit 319. Each of the battery 340 and the charging units may be provided with an overheating sensor.

The controller 380 is connected to the switch 375 so as to transmit a control signal thereto. Also, the controller 380 is connected to the charging units 382 and 394 so as to transmit a control signal thereto.

Under such configuration, when overheating occurs from the mobile terminal, the controller 380 independently controls operations of the switch 375 and the charging units 382 and 394. As a result, heat generation from the mobile terminal can be effectively controlled.

As an example, when an overheating signal is sensed during a charging operation, the controller 380 releases a connected state between one of the conductive lines and the contact unit 319 using the switch 375, so that the charging can be performed only through another line. In this case, it is preferable to release a connected state between the second diverged conductive line 372a-372b and the contact unit 319, so that the charging can be performed by the first charging unit 394 of high charging efficiency.

As another example, when an overheating signal is sensed during a charging operation, the controller 380 stops an operation of one of the charging units, so that the charging can be performed by another charging unit. In this case, it is preferable to stop an operation of the second charging unit 382, so that the charging can be performed by the first charging unit 394 of high charging efficiency.

As another example, when an overheating signal is sensed during a charging operation, the controller 380 may control the charging units so that the amount of current supplied to the battery 340 through at least one of the charging units can be reduced. In this case, the mobile terminal may be further provided with a current control unit configured to control the amount of current. The current control unit may comprise a variable resistor element, for instance.

When an overheating signal is sensed during a charging operation, the controller 380 may perform at least one of a first operation, a second operation and a third operation. The first operation may be an operation to release a connected state between the conductive lines 371 and 372 and the contact unit 319, using the switch 375. The second operation may be an operation to determine whether to operate the charging units or not. The third operation may be an operation to control the amount of a current to be supplied to the charging units. Such operations may be sequentially performed according to the degree of heat generation, or a plurality of operations may be simultaneously performed.

The present invention can have the following advantages.

Firstly, as the mobile terminal is provided with the plurality of charging units and the conductive lines are diverged from each other to pass through the charging units, a combined resistance of the diverged conductive lines can be lowered.

Secondly, as a voltage drop due to resistance, which occurs from each of the diverged conductive lines, can be lowered to a prescribed value, an adaptor of a low input voltage can be used. Under such configuration, the mobile terminal can be charged using an adaptor of high compatibility.

Thirdly, as a heat source can be distributed due to the plurality of charging units, the amount of heat generation from the mobile terminal can be reduced.

Fourthly, as the plurality of heat sources are independently controlled, heat generation from the mobile terminal can be effectively controlled during a charging operation.

Various embodiments described herein may be implemented in a computer-readable medium using, for example, software, hardware, or some combination thereof.

For a hardware implementation, the embodiments described herein may be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro processors, other electronic units designed to perform the functions described herein, or a selective combination thereof. In some cases, such embodiments are implemented by the controller 180 or the power transmission control unit 112 of the wireless power transmitter 100.

For software implementation, the embodiments such as procedures and functions may be implemented together with separate software modules each of which performs at least one of functions and operations. The software codes can be implemented with a software application written in any suitable programming language. Also, the software codes may be stored in the memory 150 of the wireless power transmitter 100, and executed by the controller 180 or the power transmission control unit 112.

The configuration of the wireless power transmitter according to the embodiment disclosed herein may be applicable to other apparatus, such as a docking station, a terminal cradle device and an electronic device, excluding a case where it is applicable to only a wireless charger.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
    a terminal body having a battery;
    a contact unit formed at one side of the terminal body and coupled to an adaptor; and
    a plurality of conductive lines configured to connect the contact unit with the battery;
    wherein a first conductive line of the plurality of conductive lines passes through a first charging unit configured to charge the battery with power received wirelessly from a wireless power transmitter,
    wherein a second conductive line passes through the second charging unit, and
    the first conductive line and the second conductive line diverge at a first point and converge at a second point between the contact unit and the battery.

2. The mobile terminal of claim 1, wherein the second conductive line of the plurality of conductive lines passes through a power management integrated circuit (PMIC).

3. The mobile terminal of claim 1, wherein:
    a resistance of the diverged first conductive line is A ohms;
    a resistance of the diverged second conductive line is B ohms; and
    a combined resistance of the diverged first conductive line and the diverged second conductive line is A*B/(A+B) ohms when a current is applied to the plurality of conductive lines via the adaptor.

4. The mobile terminal of claim 3, wherein a voltage drop across each of the diverged first conductive line and the diverged second conductive line is approximately 0.7 V.

5. The mobile terminal of claim 1, further comprising:
    a switch configured to selectively connect the contact unit to at least one of the plurality of conductive lines; and
    a controller configured to control at least the switch, the first charging unit, or the second charging unit.

6. The mobile terminal of claim 5, wherein the controller is further configured to control at least the first charging unit or the second charging unit to stop charging the battery when a temperature of the battery exceeds a predetermined threshold value while the battery is being charged.

7. The mobile terminal of claim 5, wherein the controller is further configured to control at least the first charging unit or the second charging unit to decrease an amount of a current charging the battery when a temperature of the battery exceeds a predetermined threshold value while the battery is being charged.

8. The mobile terminal of claim 5, wherein the controller is further configured to control the switch to release a connection between the at least one of the plurality of conductive lines and the contact unit when a temperature of the battery exceeds a predetermined threshold value while the battery is being charged.

9. The mobile terminal of claim 5, wherein:
    the controller is further configured to perform at least a first operation, a second operation, or a third operation based on a temperature of the battery:

the first operation comprises controlling the switch to release a connection between the at least one of the plurality of conductive lines and the contact unit;

the second operation comprises at least determining whether to control the first charging unit or the second charging unit to charge the battery; and the third operation comprises at least controlling the first charging unit or the second charging unit to reduce an amount of a current charging the battery.

10. The mobile terminal of claim 1, further comprising:

a battery cover coupled to the terminal body and configured to cover the battery; and a power receiving unit disposed at the battery cover and configured to wirelessly receive power from the wireless power transmitter.

11. The mobile terminal of claim 10, wherein the first charging unit is formed at the terminal body and positioned adjacent to the battery and the first charging unit is electrically connected to the power receiving unit via the first conductive line.

12. A mobile terminal comprising:

a terminal body having a battery;

a contact unit formed at one side of the terminal body and coupled to an adapter;

a plurality of charging units;

a plurality of conductive lines configured to connect the contact unit with the battery;

a switch configured to selectively connect the contact unit with at least one of the plurality of conductive lines; and a controller configured to control the switch or the plurality of charging units such that a charged state of the battery is controlled, wherein a first conductive line of the plurality of conductive lines passes through a first charging unit configured to charge the battery with power received wirelessly from a wireless power transmitter, wherein a second conductive line passes through the second charging unit; and the first conductive line and the second conductive line diverge at a first point and converge at a second point between the contact unit and the battery.

13. The mobile terminal of claim 12, wherein the second conductive line of the plurality of conductive lines passes through a power management integrated circuit (PMIC).

14. The mobile terminal of claim 12, wherein:

the controller is further configured to perform at least a first operation, a second operation, or a third operation when a temperature of the battery exceeds a predetermined threshold value while the battery is being charged;

the first operation comprises controlling the switch to release the connection between the at least one of the plurality of conductive lines and the contact unit;

the second operation comprises determining whether to control at least one of the plurality of charging units to charge the battery; and the third operation comprises controlling at least one of the plurality of charging units to reduce an amount of a current charging the battery.

15. The mobile terminal of claim 12, wherein:

the controller is further configured to perform at least a first operation, a second operation, or a third operation when a temperature of at least one of the plurality of charging units exceeds a predetermined threshold value while the battery is being charged;

the first operation comprises controlling the switch to release the connection between the at least one of the plurality of conductive lines and the contact unit;

the second operation comprises determining whether to control at least one of the plurality of charging units to charge the battery; and the third operation comprises controlling at least one of the plurality of charging units to reduce an amount of a current charging the battery.

16. The mobile terminal of claim 12, further comprising a battery cover coupled to the terminal body and configured to cover the battery, wherein:

the plurality of charging units comprises a first charging unit formed at the terminal body and electrically connected to the battery; and the battery cover comprises a power receiving unit electrically connected to the first charging unit and configured to wirelessly receive power from a wireless power transmitter to charge the battery.

* * * * *